US009211921B2

(12) United States Patent
Zuchoski et al.

(10) Patent No.: US 9,211,921 B2
(45) Date of Patent: Dec. 15, 2015

(54) TRACK ASSEMBLY FOR PROVIDING TRACTION TO AN OFF-ROAD VEHICLE SUCH AS AN ALL-TERRAIN VEHICLE (ATV) OR A SNOWMOBILE

(75) Inventors: Jeremie Zuchoski, Sherbrooke (CA); Bernard Jean, Saint-Mathieu-du-Parc (CA)

(73) Assignee: Camso Inc., Magog (CA)

( * ) Notice: Subject to any disclaimer, the term of this patent is extended or adjusted under 35 U.S.C. 154(b) by 462 days.

(21) Appl. No.: 13/287,280

(22) Filed: Nov. 2, 2011

(65) Prior Publication Data

US 2012/0104840 A1    May 3, 2012

Related U.S. Application Data

(60) Provisional application No. 61/409,354, filed on Nov. 2, 2010.

(51) Int. Cl.
*B62D 55/10*    (2006.01)
*B62D 55/088*    (2006.01)
(Continued)

(52) U.S. Cl.
CPC .............. *B62D 55/10* (2013.01); *B62D 55/088* (2013.01); *B62D 55/0845* (2013.01); *B62D 55/065* (2013.01); *B62D 55/084* (2013.01); (Continued)

(58) Field of Classification Search
CPC ...... B62D 55/04; B62D 55/08; B62D 55/084; B62D 55/0845; B62D 55/088; B62D 55/10
USPC ......... 305/100, 107, 108, 124, 129, 130, 136, 305/142
See application file for complete search history.

(56) References Cited

U.S. PATENT DOCUMENTS 1,741,878 A * 12/1929 Rasmussen ............... 305/109
1,992,702 A * 2/1935 Koop ......................... 305/109
(Continued)

FOREIGN PATENT DOCUMENTS

CA        2701662 A1 * 10/2010
JP        02204182 A  *  8/1990
JP     2008260344 A  * 10/2008

OTHER PUBLICATIONS

Camoplast Inc., "ATV/UTV Track Systems", 2009-2010 Catalog (8 pages).
(Continued)

*Primary Examiner* — Kip T Kotter
(74) *Attorney, Agent, or Firm* — Fish & Richardson P.C.

(57) ABSTRACT

A track assembly for traction of an off-road vehicle, such as an all-terrain vehicle (ATV) or a snowmobile, is disclosed. The track assembly comprises a plurality of track-contacting wheels, which comprises: a drive wheel; and a plurality of idler wheels spaced apart in a longitudinal direction of the track assembly. The track assembly also comprises an endless track disposed around the track-contacting wheels. A frame of the track assembly may comprise a hollow frame structure. The hollow frame structure may be dimensioned to impede accumulation of snow, mud, rocks, debris, etc. in the track assembly. The track assembly may comprise interwheel guides between longitudinally adjacent ones of the idler wheels to contact a bottom run of the endless track, and/or fenders adjacent to given ones of the idler wheels. The frame's hollowness, the interwheel guides, and/or the fenders may be realized during molding of a portion of the frame using a blow molding or other fluid-based molding process.

110 Claims, 28 Drawing Sheets

(51) Int. Cl.
*B62D 55/084* (2006.01)
*B62D 55/065* (2006.01)
*B62D 55/104* (2006.01)
*B62D 55/12* (2006.01)
*B62D 55/14* (2006.01)
*B62K 5/01* (2013.01)
*B62M 27/02* (2006.01)

(52) U.S. Cl.
CPC ............ *B62D55/104* (2013.01); *B62D 55/12* (2013.01); *B62D 55/14* (2013.01); *B62K 5/01* (2013.01); *B62M 27/02* (2013.01); *B62M 2027/027* (2013.01)

(56) References Cited

U.S. PATENT DOCUMENTS

| | | | |
|---|---|---|---|
| 4,650,259 A * | 3/1987 | Alexander et al. | 305/146 |
| D298,018 S | 10/1988 | Cartwright | |
| 4,981,188 A * | 1/1991 | Kadela | 180/9.25 |
| 5,611,572 A * | 3/1997 | Alava | 280/847 |
| 6,095,275 A | 8/2000 | Shaw | |
| 6,209,669 B1 * | 4/2001 | Young | 180/9.52 |
| 6,401,847 B1 | 6/2002 | Lykken | |
| D476,599 S | 7/2003 | Whittington | |
| D488,171 S | 4/2004 | Juncker et al. | |
| 6,874,586 B2 | 4/2005 | Boivin et al. | |
| D505,136 S | 5/2005 | Brazier | |
| D528,133 S | 9/2006 | Brazier | |
| 7,131,508 B2 | 11/2006 | Brazier | |
| D556,791 S | 12/2007 | Brazier | |
| 7,464,997 B2 * | 12/2008 | Longley | 305/128 |
| 7,497,530 B2 | 3/2009 | Bessette | |
| 7,597,161 B2 | 10/2009 | Brazier | |
| 7,708,092 B2 | 5/2010 | Després | |
| 7,832,814 B2 * | 11/2010 | Breton | 305/110 |
| 7,980,639 B2 * | 7/2011 | Matthys | 305/109 |
| 2004/0239092 A1 * | 12/2004 | Haringer | 280/781 |
| 2007/0170777 A1 * | 7/2007 | Plante et al. | 305/130 |
| 2007/0240917 A1 * | 10/2007 | Duceppe | 180/9.21 |
| 2009/0194345 A1 | 8/2009 | Bessette | |
| 2010/0012399 A1 * | 1/2010 | Hansen | 180/9.26 |
| 2011/0068620 A1 | 3/2011 | Delisle et al. | |
| 2011/0148189 A1 | 6/2011 | Courtemanche et al. | |
| 2011/0315459 A1 | 12/2011 | Zuchoski et al. | |
| 2012/0001478 A1 | 1/2012 | Zuchoski et al. | |
| 2013/0134772 A1 | 5/2013 | Dandurand et al. | |
| 2013/0134773 A1 | 5/2013 | Dandurand et al. | |

OTHER PUBLICATIONS

Brooks, Linda G., "Office Action", U.S. Appl. No. 29/405,414, mailed on Nov. 9, 2012 (8 pages).
Brooks, Linda G., "Office Action", U.S. Appl. No. 29/405,416, mailed on Nov. 9, 2012 (8 pages).
Brooks, Linda G., "Office Action", U.S. Appl. No. 29/405,417, mailed on Nov. 9, 2012 (9 pages).
U.S. Appl. No. 13/649,312, filed Oct. 2012, Zuchoski et al.

* cited by examiner

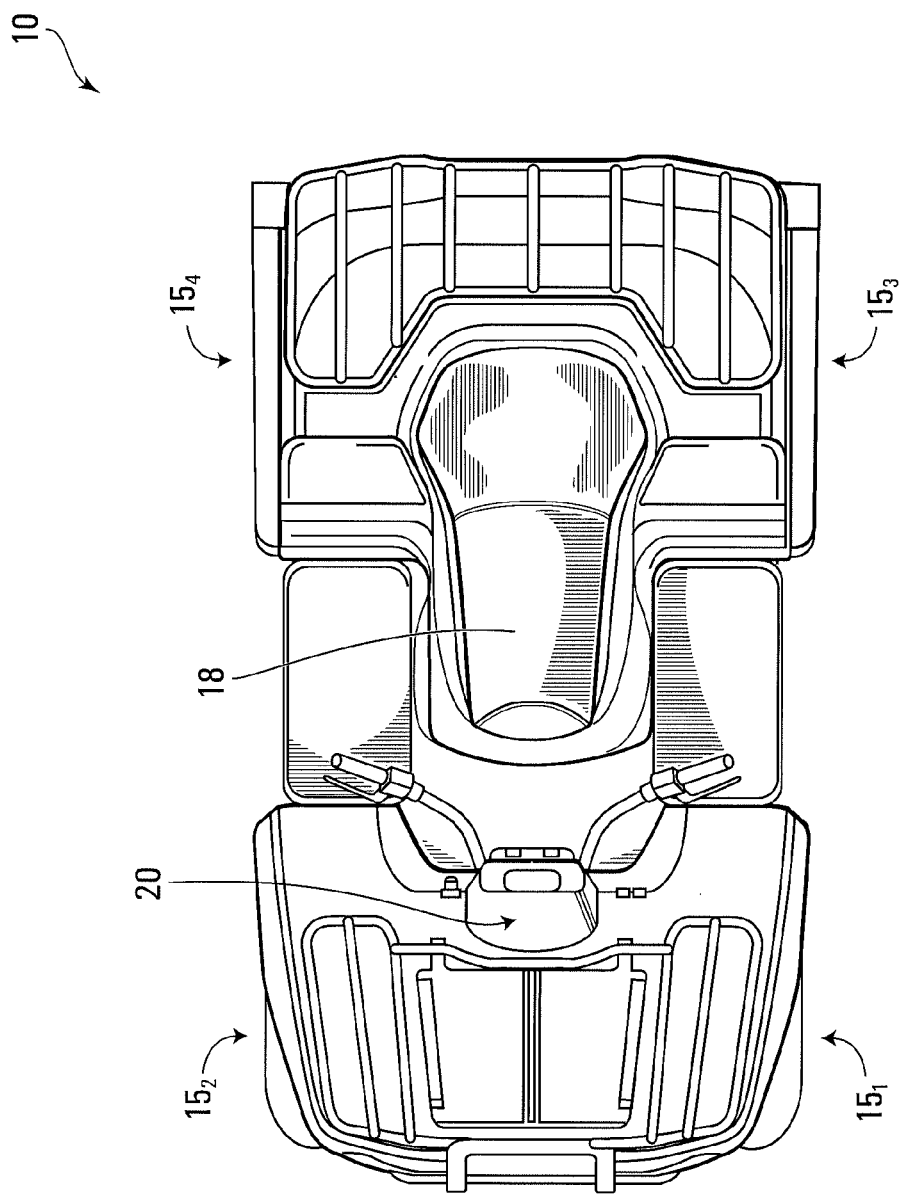

TRACK ASSEMBLY FOR PROVIDING TRACTION TO AN OFF-ROAD VEHICLE SUCH AS AN ALL-TERRAIN VEHICLE (ATV) OR A SNOWMOBILE

CROSS-REFERENCE TO RELATED APPLICATION

This application claims the benefit under 35 USC 119(e) of U.S. Provisional Patent Application No. 61/409,354 filed on Nov. 2, 2010 and hereby incorporated by reference herein.

FIELD OF THE INVENTION

The invention relates generally to off-road vehicles such as all-terrain vehicles (ATVs) and snowmobiles and, more particularly, to track assemblies for providing traction to ATVs, snowmobiles and other off-road vehicles.

BACKGROUND

All-terrain vehicles (ATVs) used for recreational, utility and/or other purposes are sometimes provided with track assemblies having endless tracks which engage the ground for traction. The track assemblies are mounted in place of ground-engaging wheels which would otherwise be used for traction in order to enhance the ATV's floatation and traction on the ground.

A track assembly of an ATV typically comprises a frame, a plurality of wheels, and an endless track disposed around the frame and the wheels to engage the ground. The endless track is driven around the frame and the wheels to generate traction. The frame supports various components of the track assembly, including some of the wheels.

While various designs of track assemblies have been developed for ATVs, they suffer from some drawbacks. For example, existing ATV track assemblies may not be optimal for high-speed riding on trails or for riding in other situations or environments. Dynamics of an ATV may change significantly because of the track assemblies' additional weight and configuration which are different from that of ground-engaging wheels with which the ATV may have been designed to be equipped. Also, during riding, the track assemblies tend to accumulate undesirable ground matter (i.e., mud, rocks, soil, ice, snow, and/or other debris on the ground) that increase their weight even more. Ride comfort is also not optimal in rough terrain because a track assembly's roller wheels, which roll on its endless track, engage the track only at limited areas, thereby potentially causing local deformation on the track that may create impacts and detrimentally affect ride comfort.

Track assemblies of snowmobiles and other off-road vehicles may suffer from similar and/or other drawbacks.

There thus remains a need to improve the performance of track assemblies for ATVs, snowmobiles and other off-road vehicles.

SUMMARY OF THE INVENTION

According to an aspect of the invention, there is provided a track assembly for traction of an off-road vehicle. The track assembly comprises a plurality of track-contacting wheels, which comprises: a drive wheel; and a plurality of idler wheels spaced apart in a longitudinal direction of the track assembly. The track assembly also comprises an endless track disposed around the track-contacting wheels and comprising an inner side facing the track-contacting wheels and a ground-engaging outer side for engaging the ground. The drive wheel is rotatable to impart motion of the endless track. The idler wheels contact a bottom run of the endless track. The track assembly also comprises a frame supporting the idler wheels. The frame comprises a nonmetallic hollow frame structure.

According to another aspect of the invention, there is provided a track assembly for traction of an off-road vehicle. The track assembly comprises a plurality of track-contacting wheels, which comprises: a drive wheel; and a plurality of idler wheels spaced apart in a longitudinal direction of the track assembly. The track assembly also comprises an endless track disposed around the track-contacting wheels and comprising an inner side facing the track-contacting wheels and a ground-engaging outer side for engaging the ground. The drive wheel is rotatable to impart motion of the endless track. The idler wheels contact a bottom run of the endless track. The track assembly also comprises a frame supporting the idler wheels. The frame comprises a hollow frame structure. The hollow frame structure extends at least as high as a given one of the idler wheels such that a point of the hollow frame structure aligned with a top of the given one of the idler wheels in the longitudinal direction of the track assembly is located at least as high as the top of the given one of the idler wheels.

According to another aspect of the invention, there is provided a track assembly for traction of an off-road vehicle. The track assembly comprises a plurality of track-contacting wheels, which comprises: a drive wheel; and a plurality of idler wheels spaced apart in a longitudinal direction of the track assembly. The track assembly also comprises an endless track disposed around the track-contacting wheels and comprising an inner side facing the track-contacting wheels and a ground-engaging outer side for engaging the ground. The drive wheel is rotatable to impart motion of the endless track. The idler wheels contact a bottom run of the endless track. The track assembly also comprises a frame supporting the idler wheels. The frame comprises a hollow frame structure. The hollow frame structure has a cross-sectional shape which changes along the longitudinal direction of the track assembly.

According to another aspect of the invention, there is provided a track assembly for traction of an off-road vehicle. The track assembly comprises a plurality of track-contacting wheels, which comprises: a drive wheel; and a plurality of idler wheels spaced apart in a longitudinal direction of the track assembly. The track assembly also comprises an endless track disposed around the track-contacting wheels and comprising an inner side facing the track-contacting wheels and a ground-engaging outer side for engaging the ground. The drive wheel is rotatable to impart motion of the endless track. The idler wheels contact a bottom run of the endless track. The track assembly also comprises a frame supporting the idler wheels. The frame comprises a hollow frame structure. The hollow frame structure is shaped to impede accumulation of undesirable ground matter over the hollow frame structure.

According to another aspect of the invention, there is provided a track assembly for traction of an off-road vehicle. The track assembly comprises a plurality of track-contacting wheels, which comprises: a drive wheel; and a plurality of idler wheels spaced apart in a longitudinal direction of the track assembly. The track assembly also comprises an endless track disposed around the track-contacting wheels and comprising an inner side facing the track-contacting wheels and a ground-engaging outer side for engaging the ground. The drive wheel is rotatable to impart motion of the endless track. The idler wheels contact a bottom run of the endless track.

The track assembly also comprises a frame supporting the idler wheels. The frame comprises a blow-molded hollow frame structure.

According to another aspect of the invention, there is provided a track assembly for traction of an off-road vehicle. The track assembly comprises a plurality of track-contacting wheels, which comprises: a drive wheel; and a plurality of idler wheels spaced apart in a longitudinal direction of the track assembly. The track assembly also comprises an endless track disposed around the track-contacting wheels and comprising an inner side facing the track-contacting wheels and a ground-engaging outer side for engaging the ground. The drive wheel is rotatable to impart motion of the endless track. The idler wheels contact a bottom run of the endless track. The track assembly also comprises an interwheel guide for contacting the bottom run of the endless track. The interwheel guide is located between a first one of the idler wheels and a second one of the idler wheels which are adjacent to one another in the longitudinal direction of the track assembly.

According to another aspect of the invention, there is provided a track assembly for traction of an off-road vehicle. The track assembly comprises a plurality of track-contacting wheels, which comprises: a drive wheel; and a plurality of idler wheels spaced apart in a longitudinal direction of the track assembly. The track assembly also comprises an endless track disposed around the track-contacting wheels and comprising an inner side facing the track-contacting wheels and a ground-engaging outer side for engaging the ground. The drive wheel is rotatable to impart motion of the endless track. The idler wheels contact a bottom run of the endless track. The track assembly also comprises a fender adjacent to a given one of the idler wheels.

According to another aspect of the invention, there is provided a track assembly for traction of an off-road vehicle. The track assembly comprises a plurality of track-contacting wheels, which comprises: a drive wheel; and a plurality of idler wheels spaced apart in a longitudinal direction of the track assembly. The track assembly also comprises an endless track disposed around the track-contacting wheels and comprising an inner side facing the track-contacting wheels and a ground-engaging outer side for engaging the ground. The drive wheel is rotatable to impart motion of the endless track. The idler wheels contact a bottom run of the endless track. The track assembly also comprises a deflector for deflecting undesirable ground matter transported by the endless track to reduce undesirable ground matter accumulation in the track assembly.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which:

FIGS. 2A and 2B show the ATV equipped with ground-engaging wheels instead of the track assemblies;

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

Figure 1A:
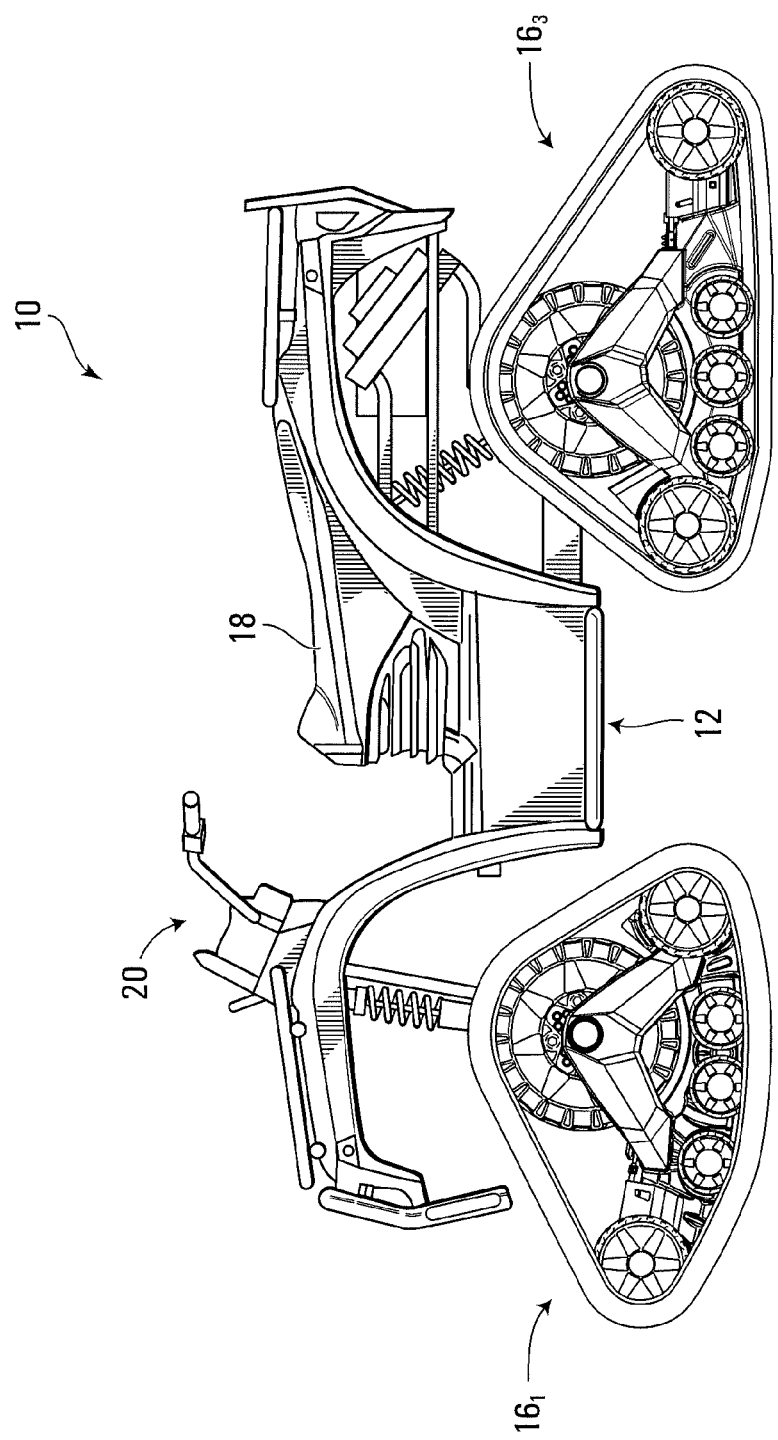
FIGS. 1A and 1B show an example of an all-terrain vehicle (ATV) comprising track assemblies in accordance with an embodiment of the invention.
Figure 1B:
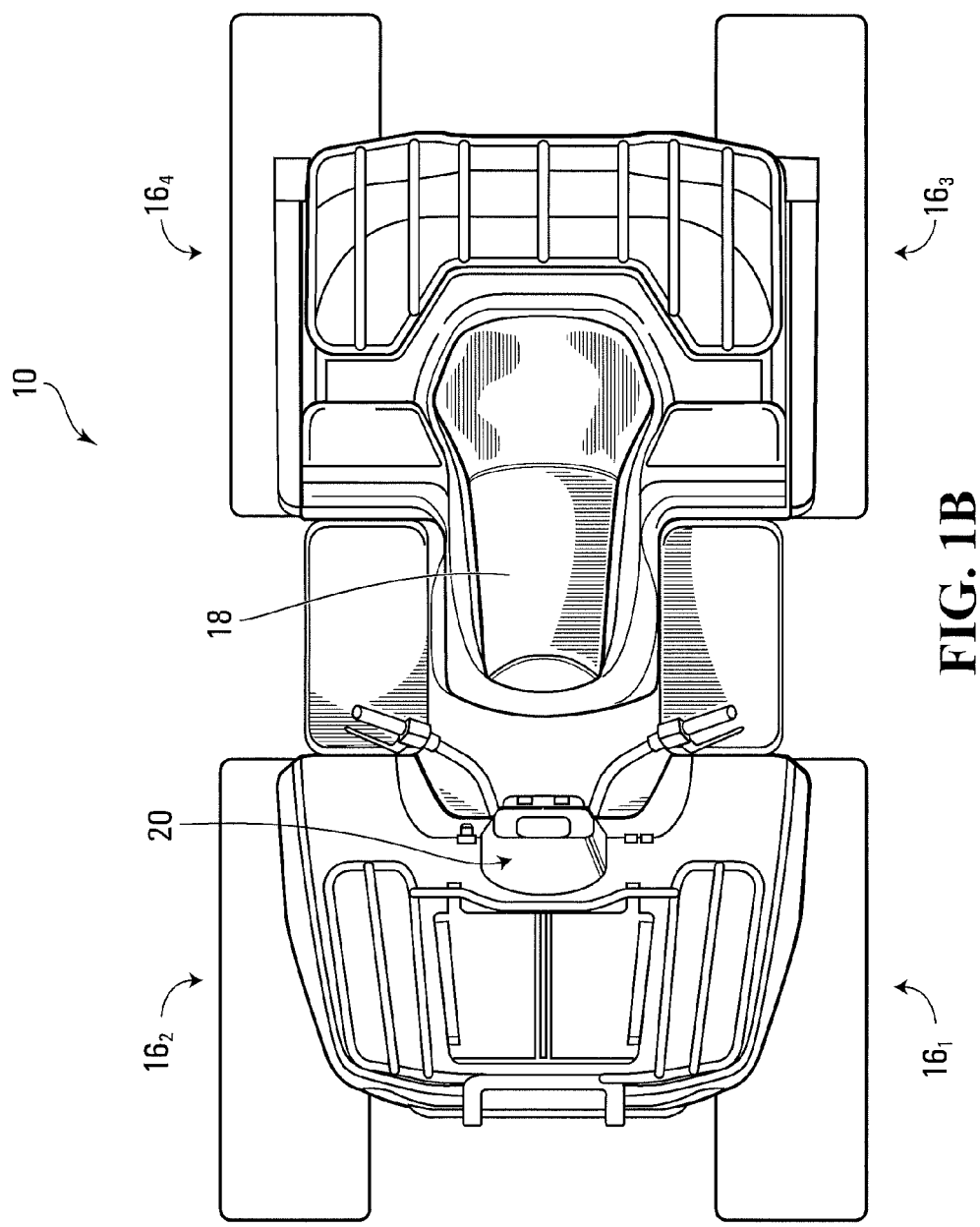

FIG. 1 shows an all-terrain vehicle (ATV) 10 in accordance with an embodiment of the invention. The ATV 10 is a small open vehicle designed to travel off-road on a variety of terrains, including roadless rugged terrain, for recreational, utility and/or other purposes.

In this embodiment, the ATV 10 comprises a prime mover 12, a plurality of track assemblies $16_1$-$16_4$, a seat 18, and a user interface 20, which enable a user of the ATV to ride the ATV 10 on the ground.

The prime mover 12 is a source of motive power that comprises one or more motors. For example, in this embodiment, the prime mover 12 comprises an internal combustion engine. In other embodiments, the prime mover 12 may comprise another type of motor (e.g., an electric motor) or a combination of different types of motor (e.g., an internal combustion engine and an electric motor).

The prime mover 12 is in a driving relationship with one or more of the track assemblies $16_1$-$16_4$. That is, motive power generated by the prime mover 12 is transmitted to one or more of the track assemblies $16_1$-$16_2$ via a powertrain of the ATV 10 (e.g., via a transmission and a differential of the powertrain).

In this case, the seat 18 is a straddle seat and the ATV 10 is usable by a single person such that the seat 18 accommodates only that person driving the ATV 10. In other cases, the seat 18 may be another type of seat, and/or the ATV 10 may be usable by two individuals, namely one person driving the ATV 10 and a passenger, such that the seat 18 may accommodate both of these individuals (e.g., behind one another or side-by-side) or the ATV 10 may comprise an additional seat for the passenger. For example, in other embodiments, the ATV 10 may be a side-by-side ATV, sometimes referred to as a "utility terrain vehicle" or "UTV".

The user interface 20 allows the user to interact with the ATV 10. More particularly, the user interface 20 comprises an accelerator, a brake control, and a steering device that are operated by the user to control motion of the ATV 10 on the ground. In this case, the steering device comprises handlebars. In other cases, the steering device may comprise a steering wheel or other type of steering element. The user interface 20 also comprises an instrument panel (e.g., a dashboard) which provides indicators (e.g., a speedometer indicator, a tachometer indicator, etc.) to convey information to the user.

The track assemblies $16_1$-$16_4$ engage the ground to provide traction to the ATV 10. More particularly, in this example, front ones of the track assemblies $16_1$-$16_4$ provide front traction to the ATV 10 while rear ones of the track assemblies $16_1$-$16_4$ provide rear traction to the ATV 10. Each of the front ones of the track assemblies $16_1$-$16_4$ is pivotable about a steering axis of the ATV 10 in response to input of the user at the handlebars in order to steer the ATV 10 on the ground.

Figure 2A:
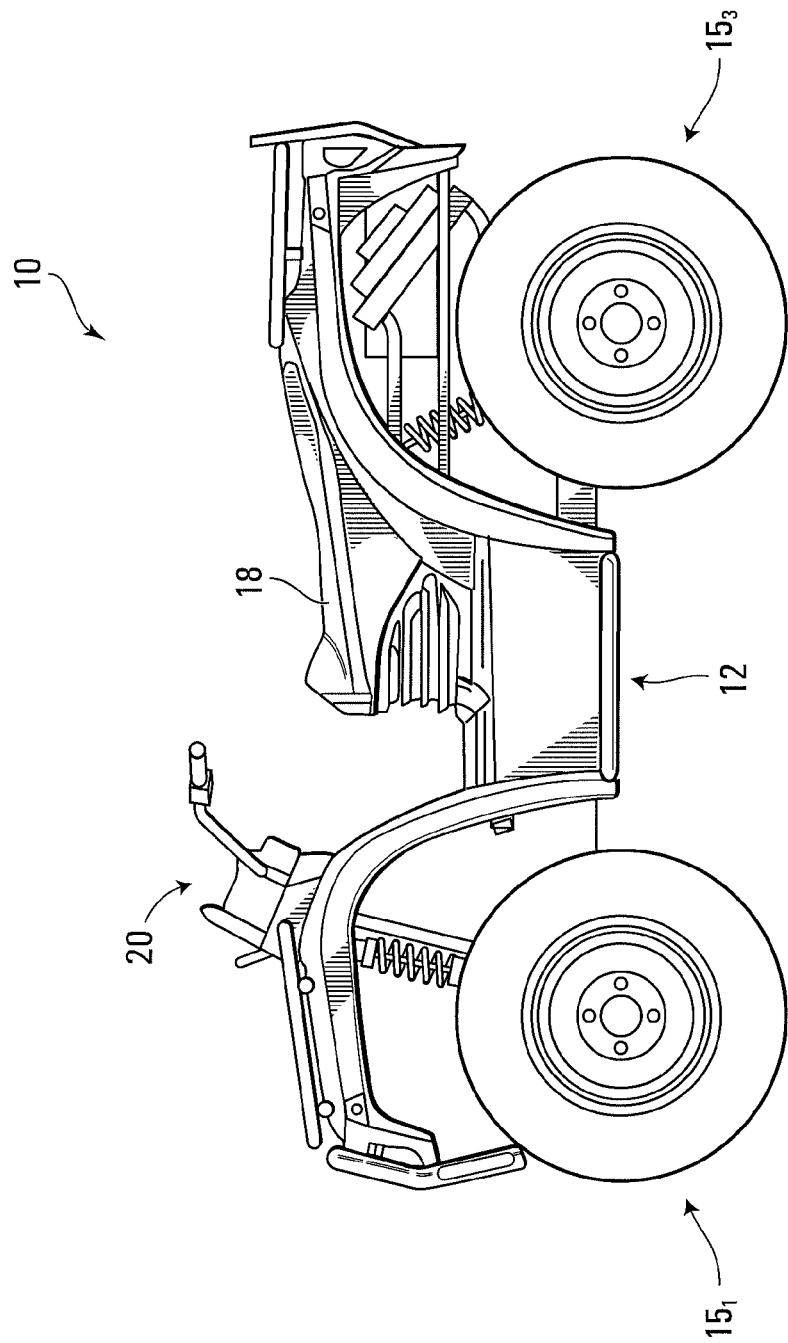
Figure 3:
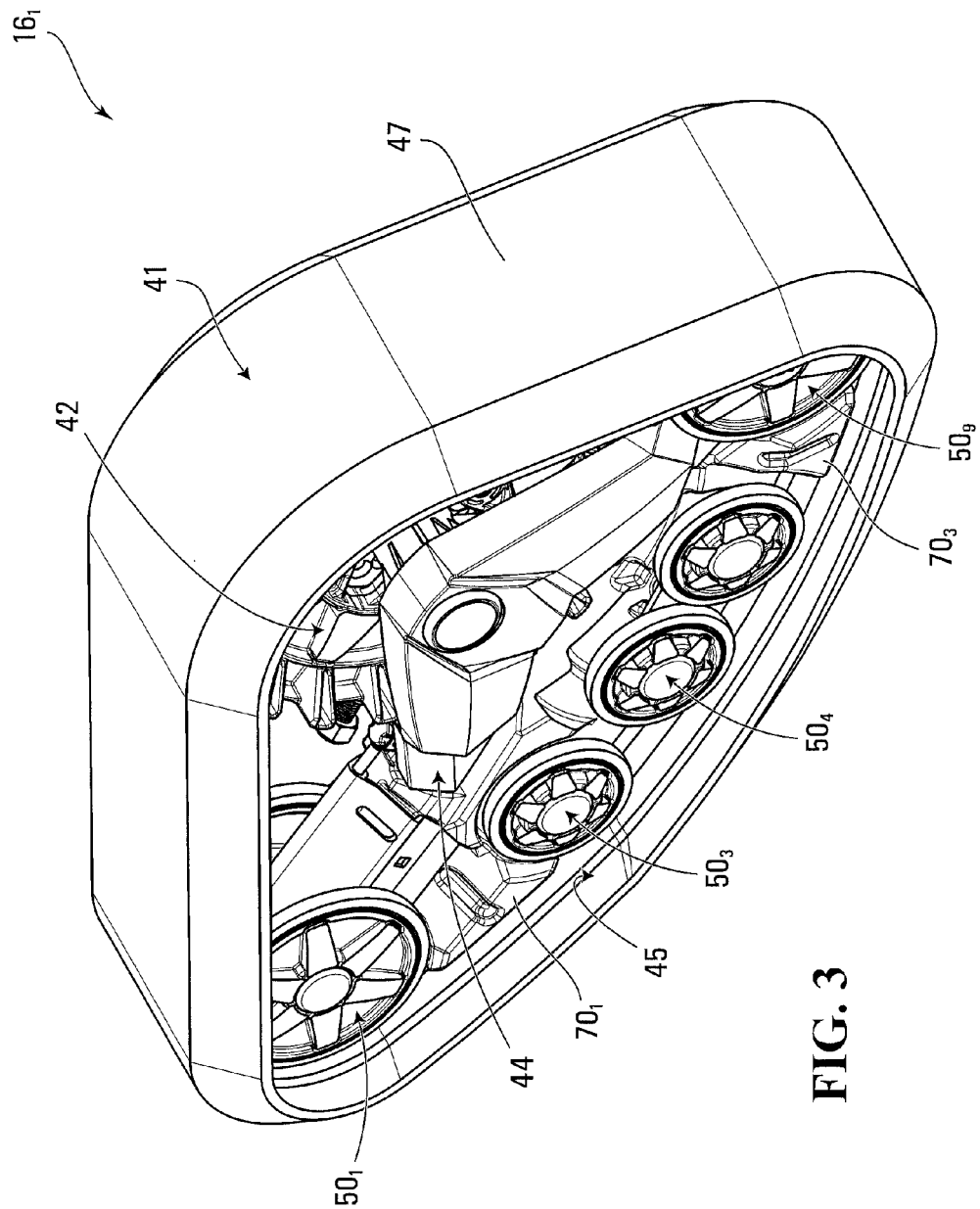
FIGS. 3 and 5 respectively show a perspective view and a side view of a front track assembly.
Figure 4:
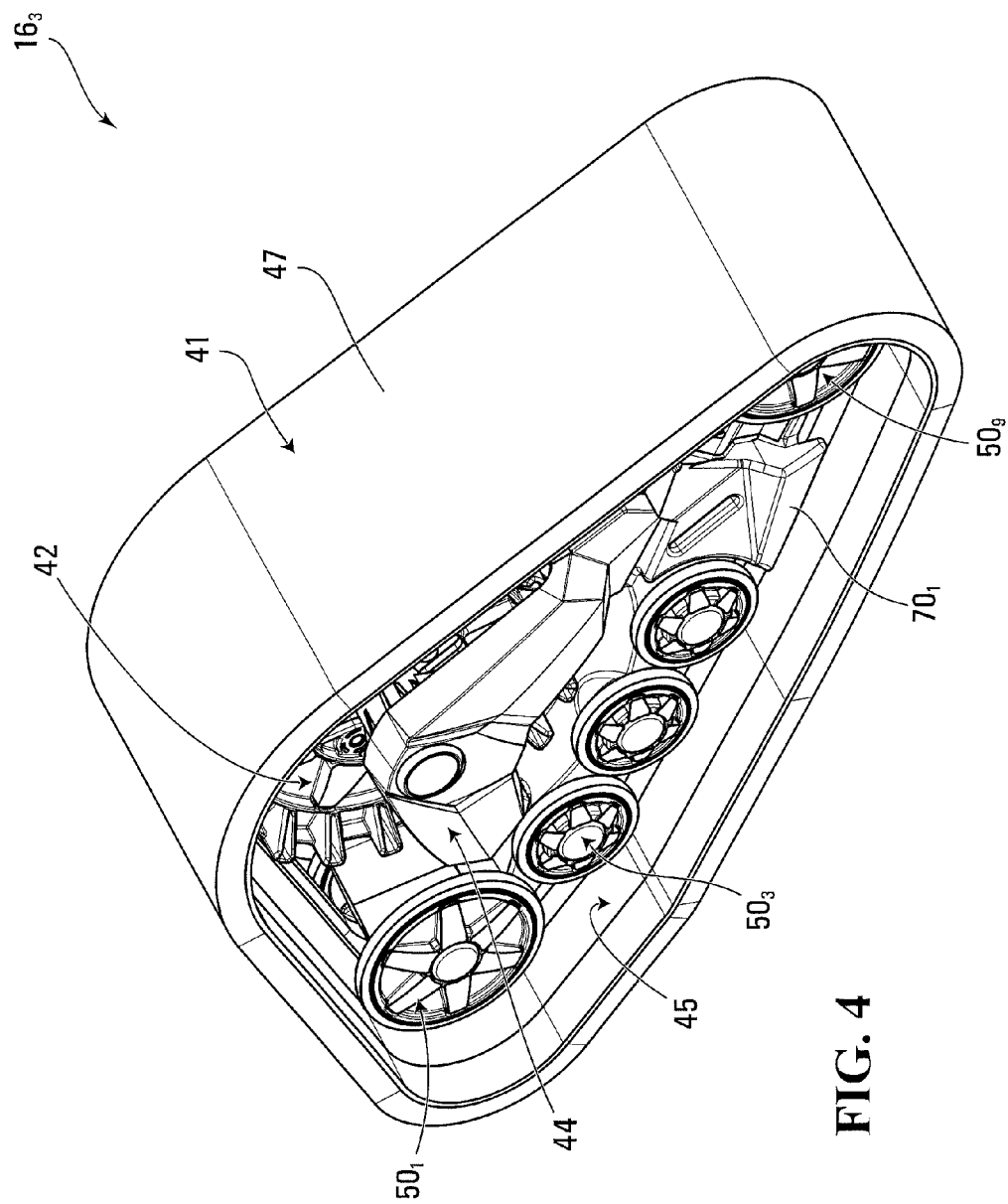
FIGS. 4 and 6 respectively show a perspective view and a side view of a rear track assembly.
Figure 5:
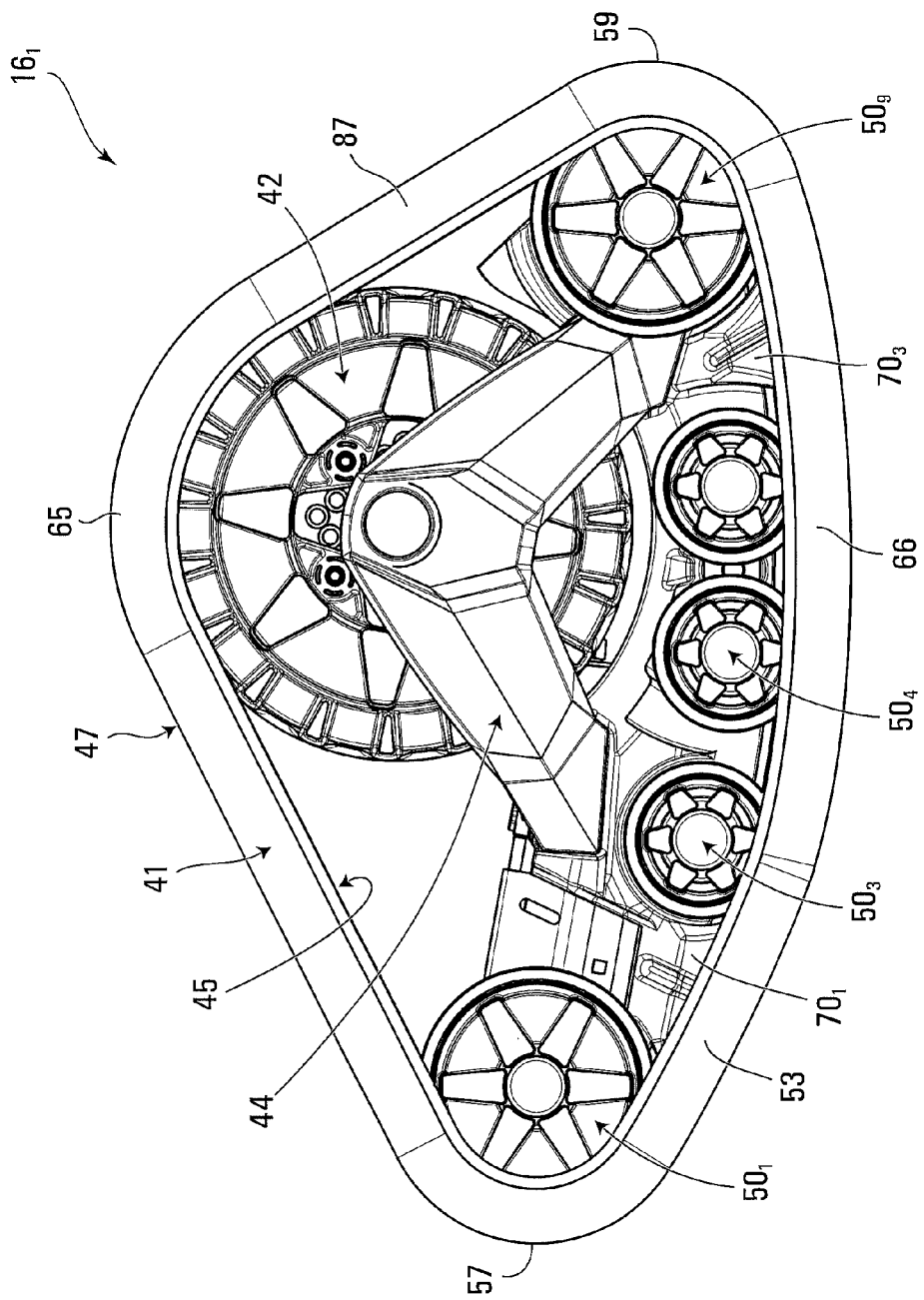
Figure 6:
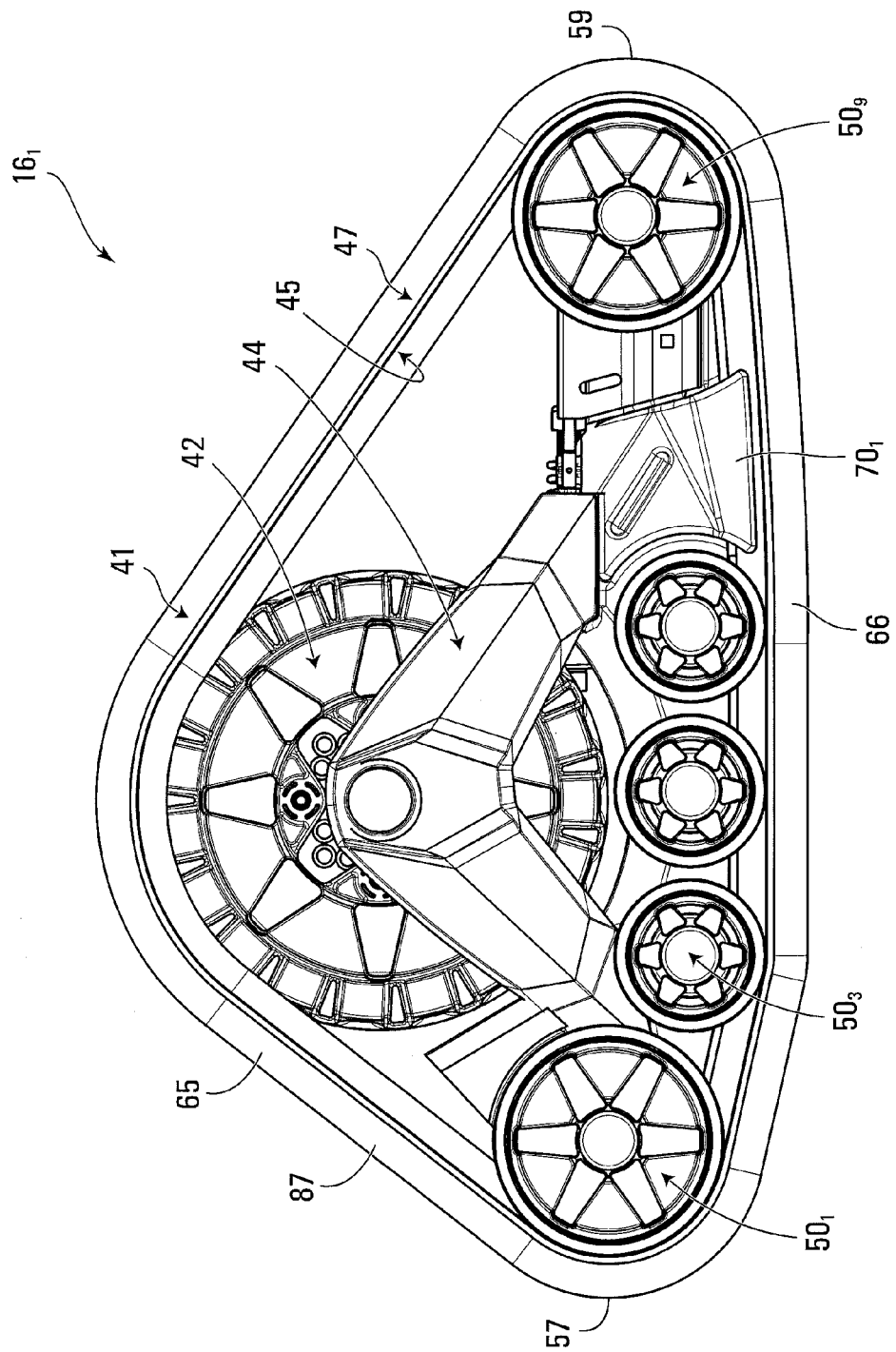
Figure 7:
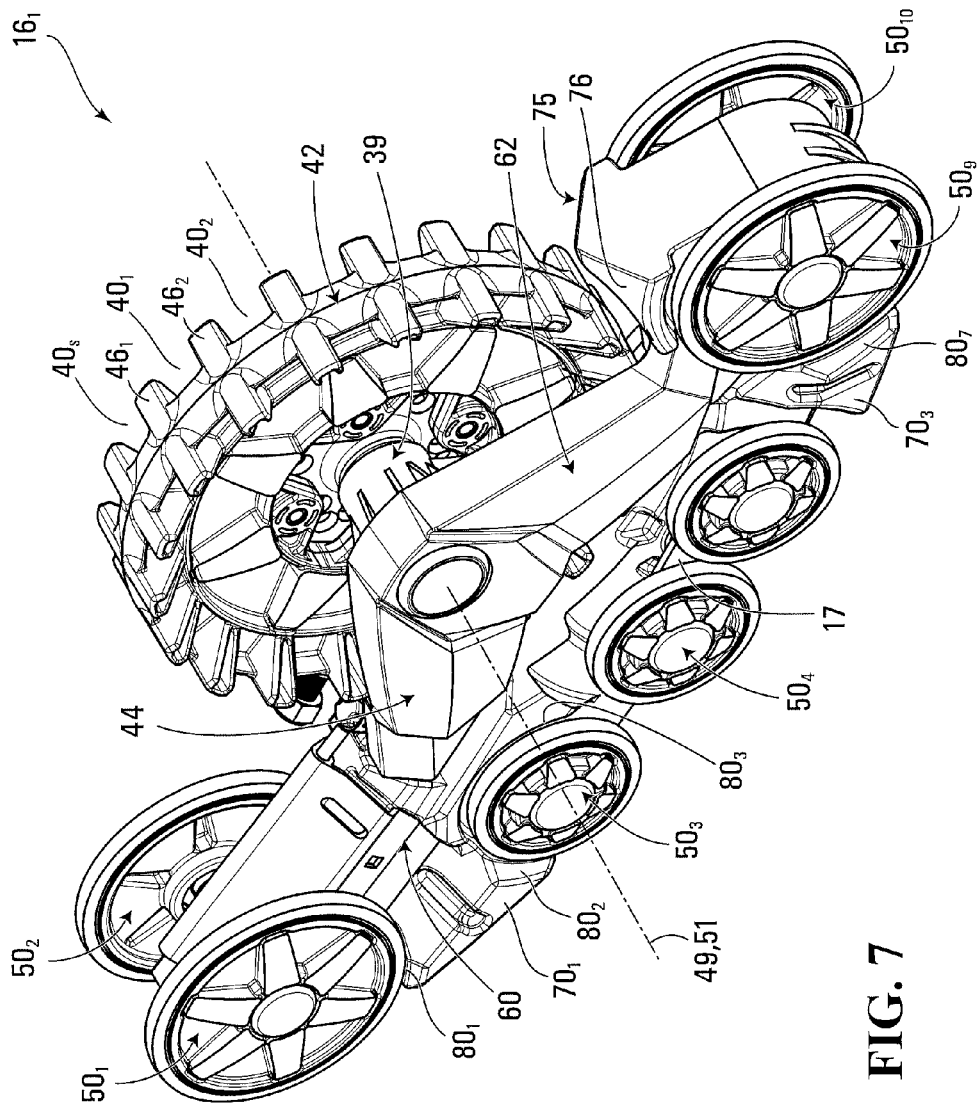
FIGS. 7, 9 and 10 respectively show a perspective view, a side view and a top view of the front track assembly without an endless track thereof.
Figure 8:
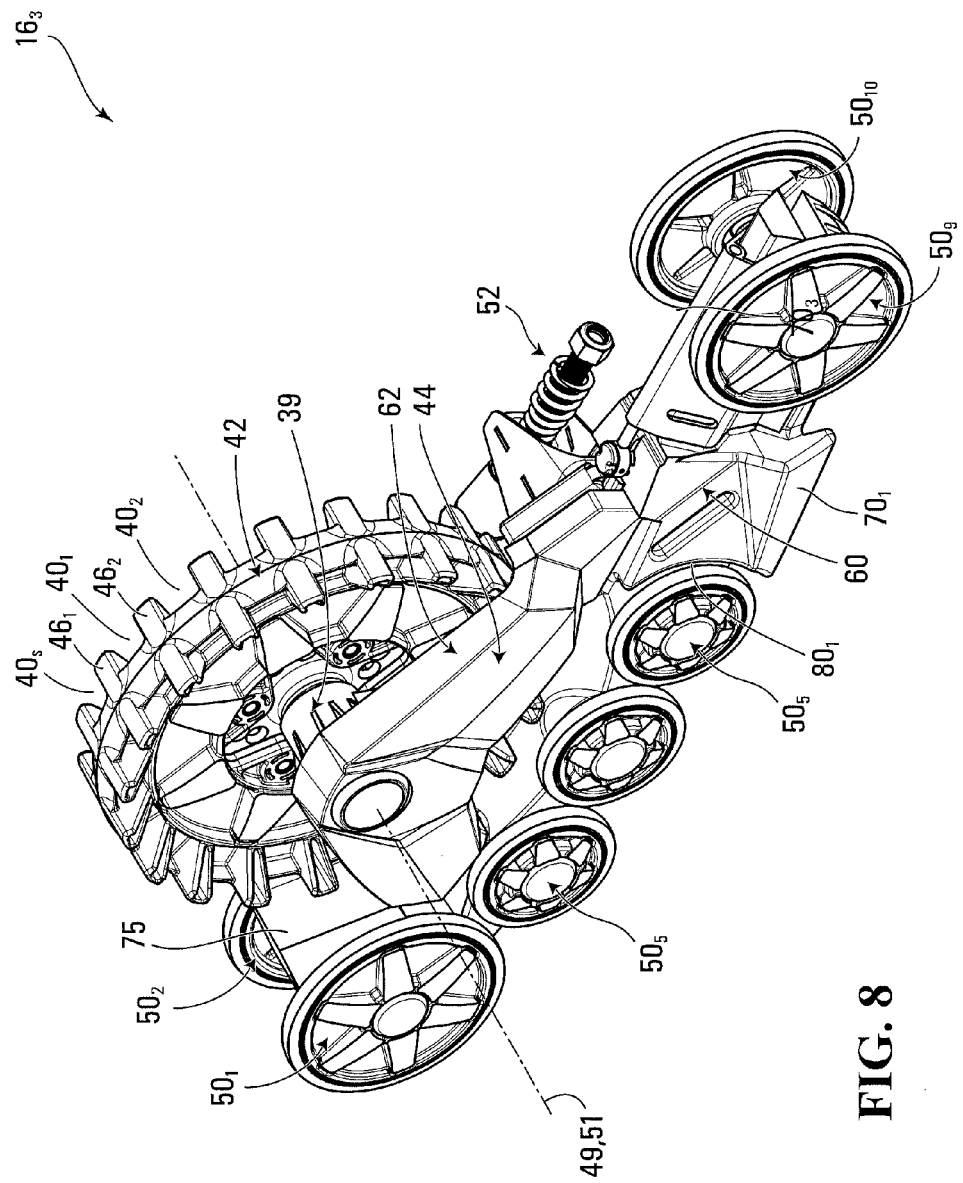
FIGS. 8, 11 and 12 respectively show a perspective view, a side view and a top view of the rear track assembly without an endless track thereof.
Figure 9:
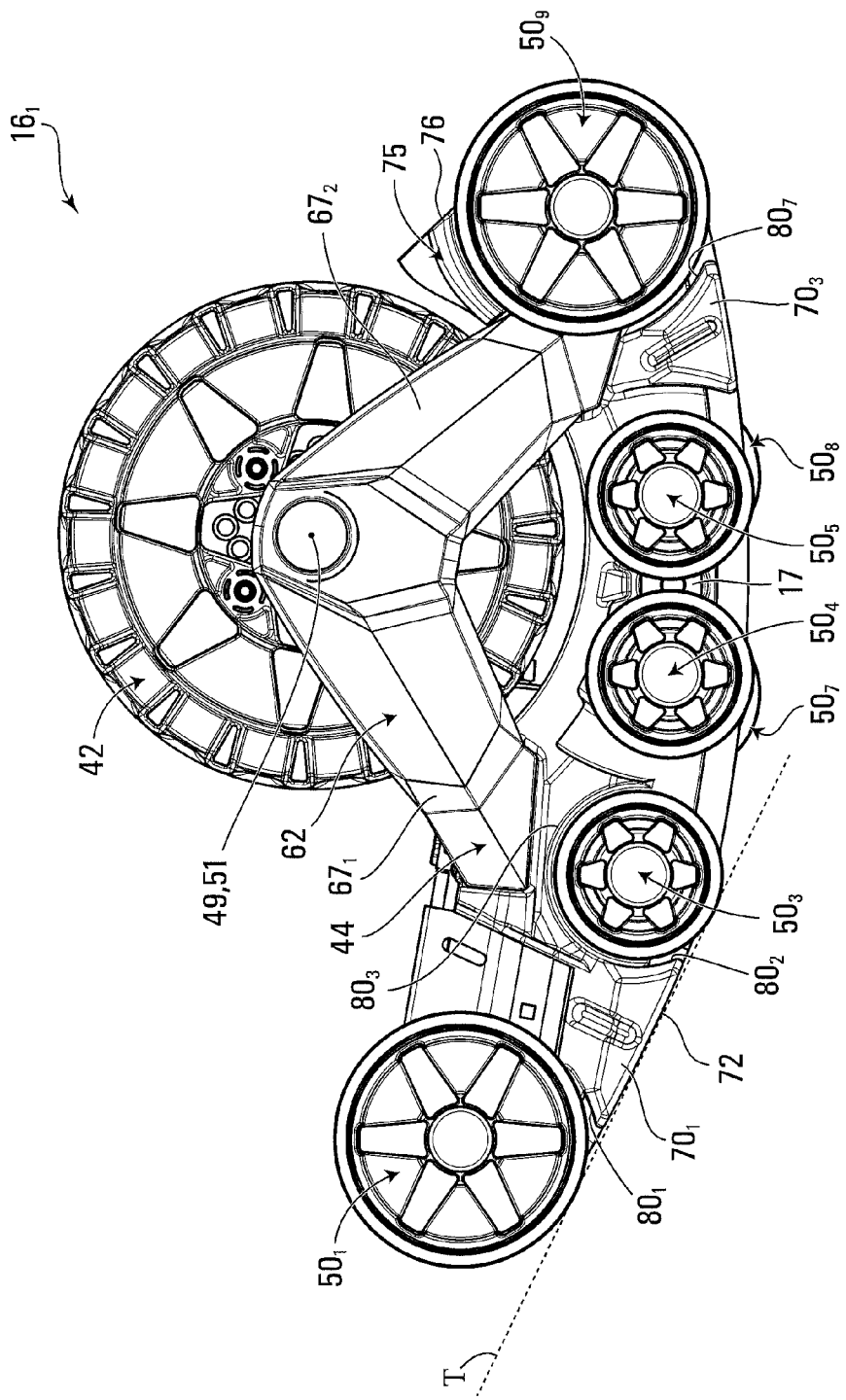
Figure 10:
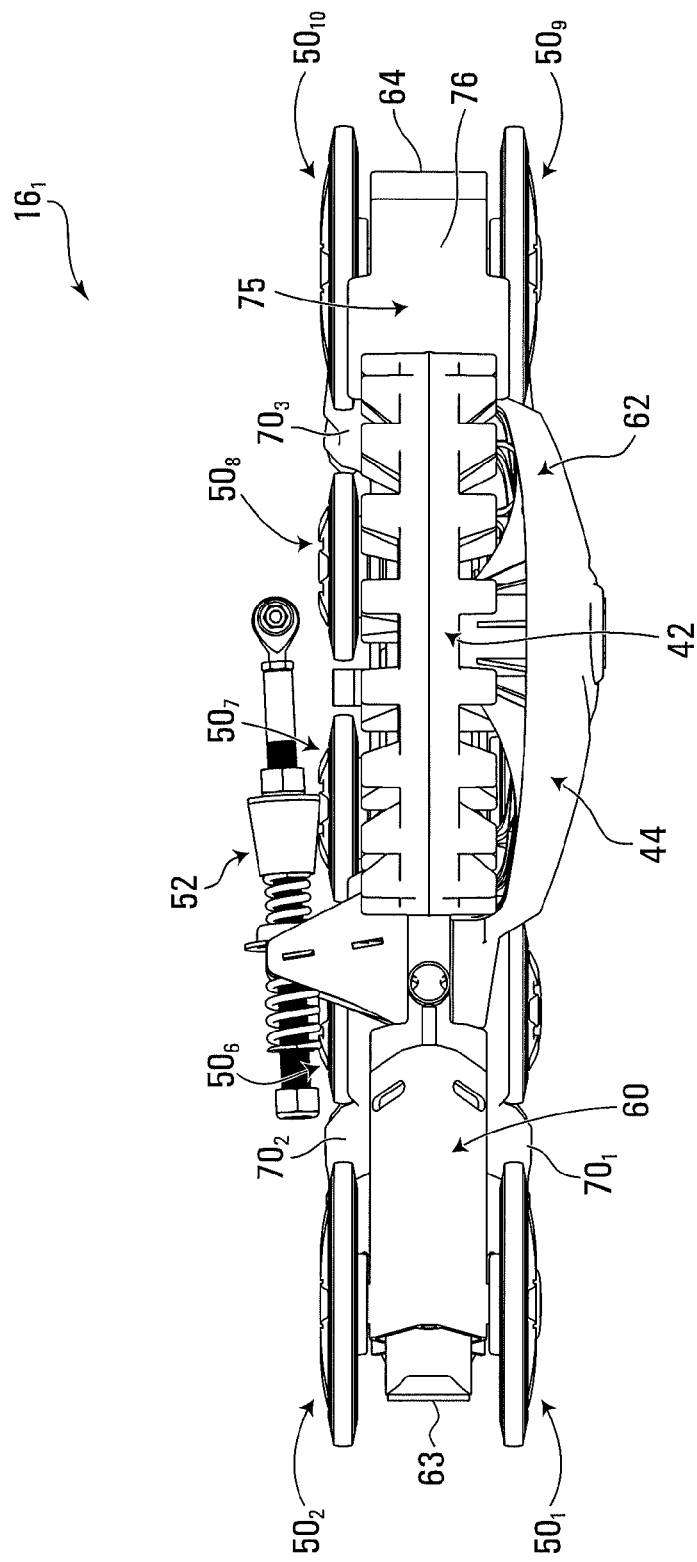
Figure 11:
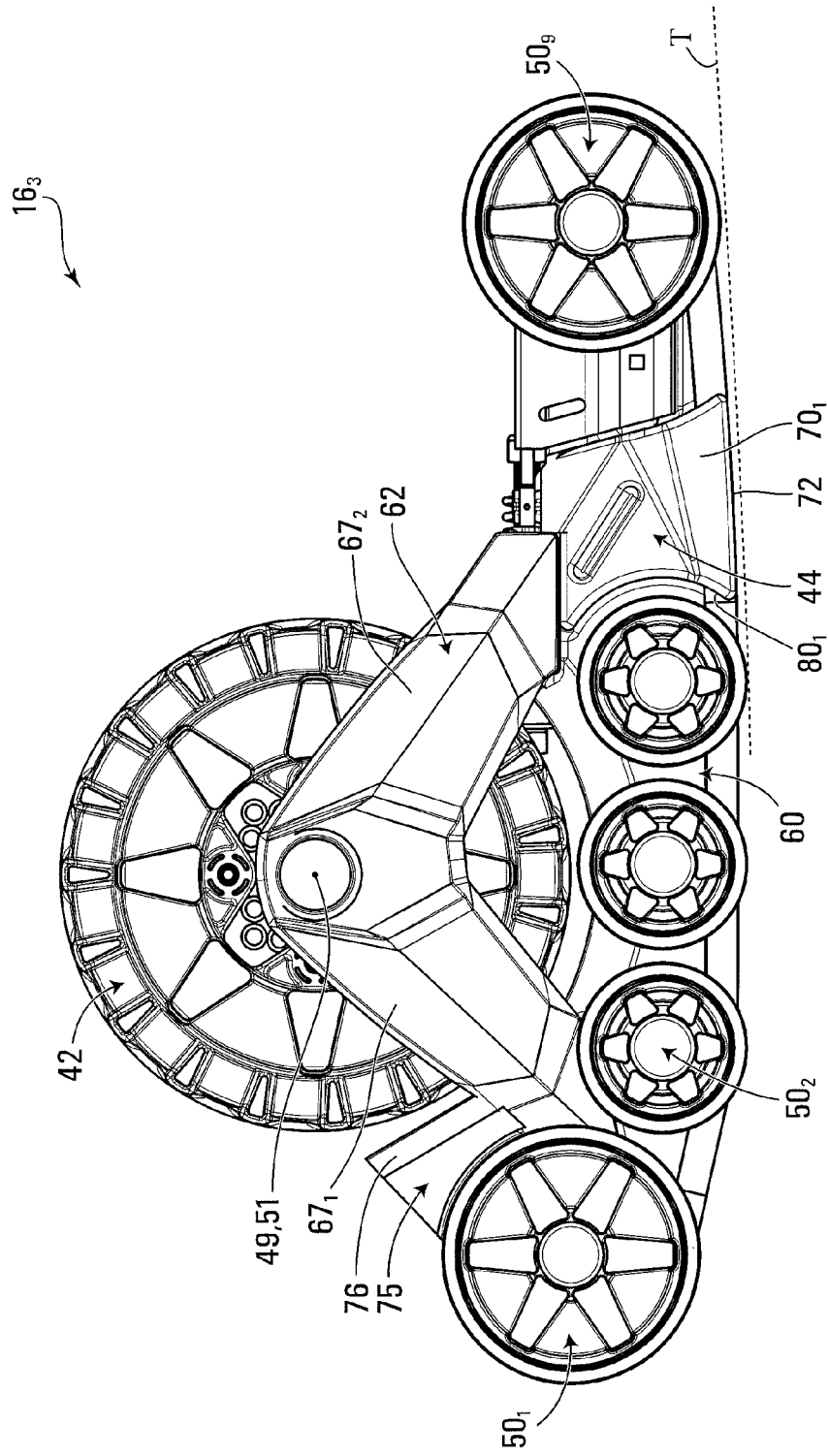
Figure 12:
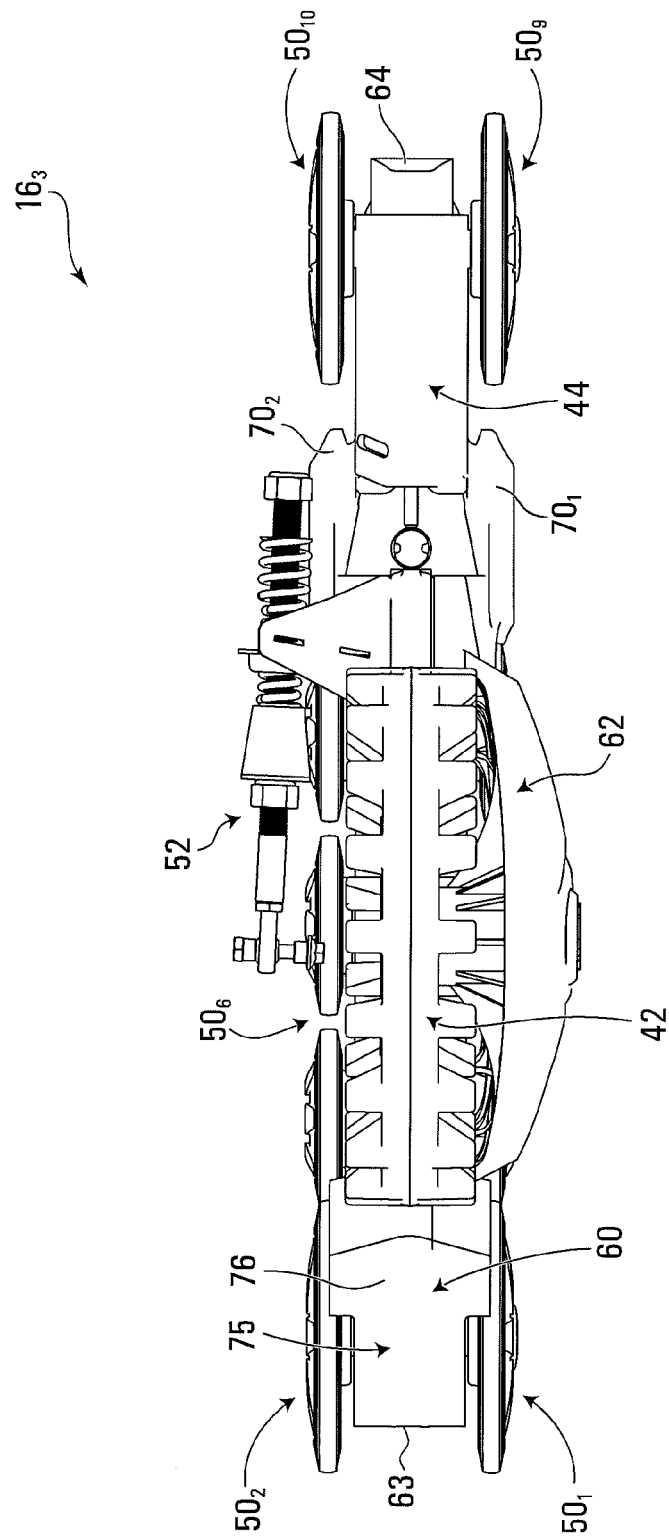
Figure 13:
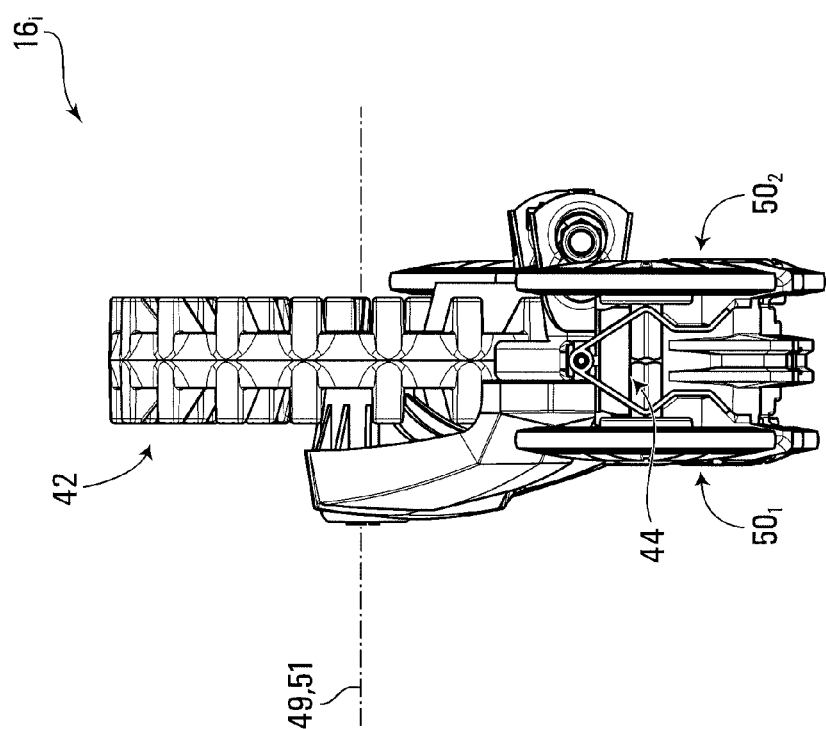
FIG. 13 shows an end view of the rear track assembly.

In this embodiment, each track assembly $16_i$ is mounted in place of a ground-engaging wheel that may otherwise be mounted at a position of the track assembly $16_i$ to propel the ATV 10 on the ground. For example, as shown in FIG. 2, the ATV 10 may be propelled on the ground by four ground-engaging wheels $15_1$-$15_4$ with tires instead of the track assemblies $16_1$-$16_4$. Basically, in this embodiment, the track assemblies $16_1$-$16_4$ may be used to convert the ATV 10 from a wheeled vehicle into a tracked vehicle, thereby enhancing its traction and floatation on the ground.

With additional reference to FIGS. 3 to 13, in this embodiment, each track assembly $16_i$ comprises a frame 44, a plurality of track-contacting wheels including a drive wheel 42 and a plurality of idler wheels $50_1$-$50_{10}$, and an endless track 41 disposed around the frame 44 and the wheels 42, $50_1$-$50_{10}$. The track assembly $16_i$ has a front longitudinal end 57 and a rear longitudinal end 59 that define a length of the track assembly $16_i$. A width of the track assembly $16_i$ is defined by a width of the endless track 41. The track assembly $16_i$ has a longitudinal direction, transversal directions including a widthwise direction, and a height direction.

The endless track 41 engages the ground to provide traction to the ATV 10. The track 41 has an inner side 45 facing the wheels 42, $50_1$-$50_{10}$ and defining an inner area of the track 41 in which these wheels are located. The track 41 also has a ground-engaging outer side 47 opposite the inner side 45 for engaging the ground on which the ATV 10 travels. The endless track 41 has a top run 65 which extends between the longitudinal ends 57, 59 of the track assembly $16_i$ and over the drive wheel 42, and a bottom run 66 which extends between the longitudinal ends 57, 59 of the track assembly $16_i$ and under the idler wheels $50_1$-$50_{10}$. The endless track 41 has a longitudinal direction, transversal directions including a widthwise direction, and a thickness direction.

Figure 14:
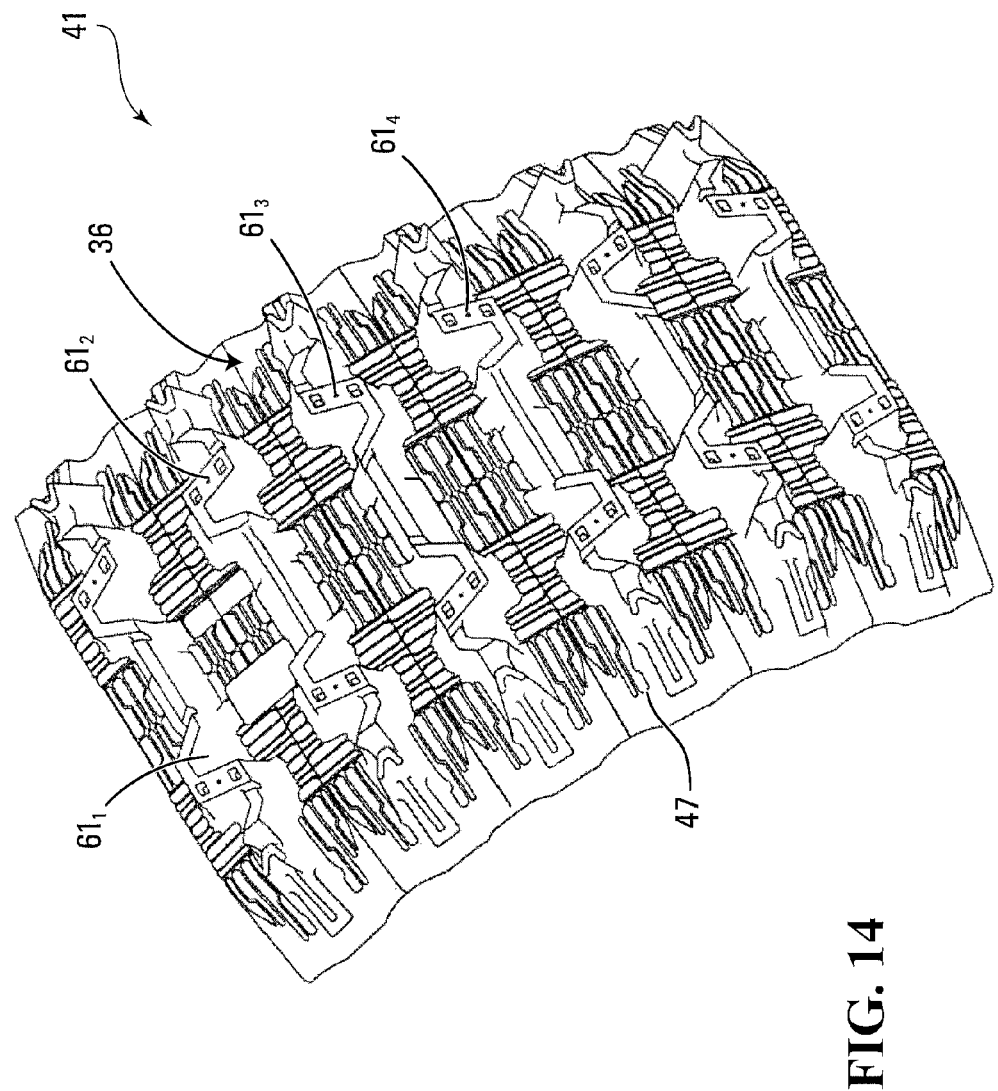
FIGS. 14 and 15 respectively show a ground-engaging outer side and an inner side of a segment of an endless track.
Figure 15:
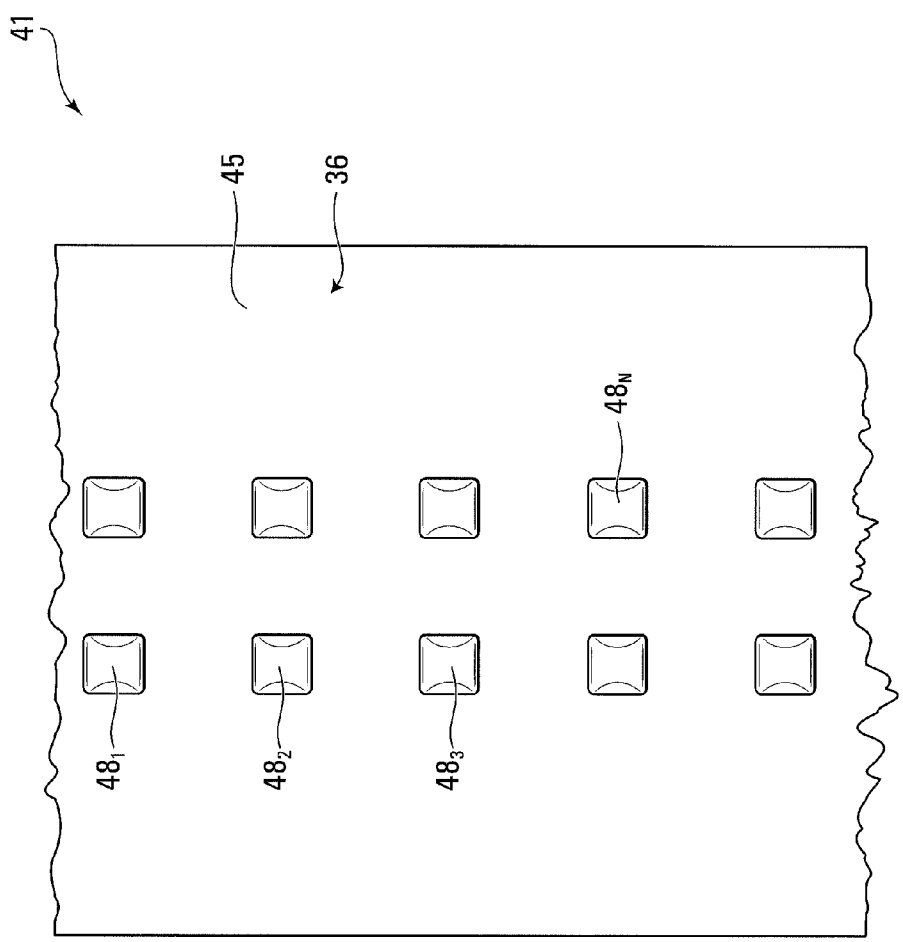
Figure 16:
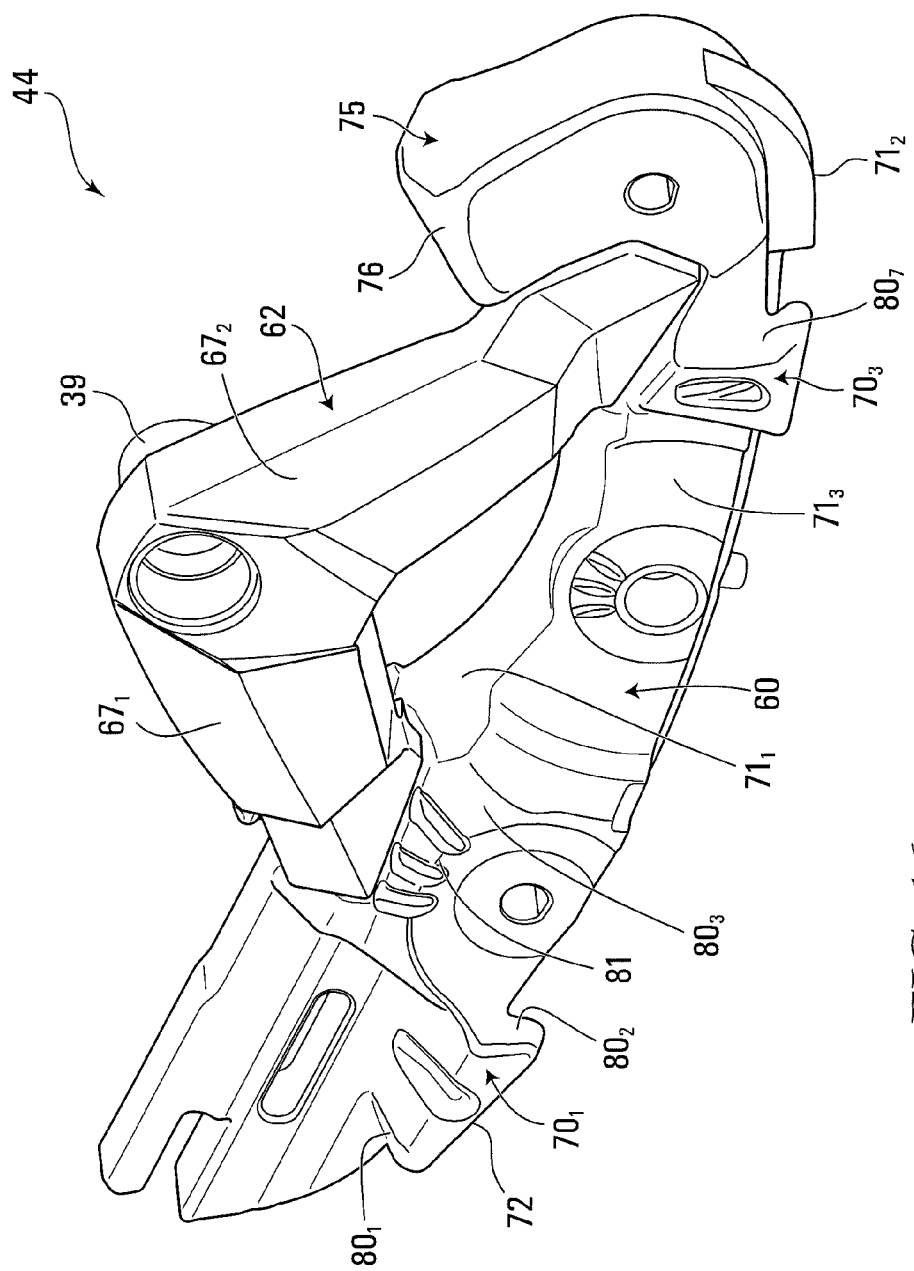
FIGS. 16 and 18 respectively show a perspective view and a side view of a frame of the front track assembly.
Figure 17:
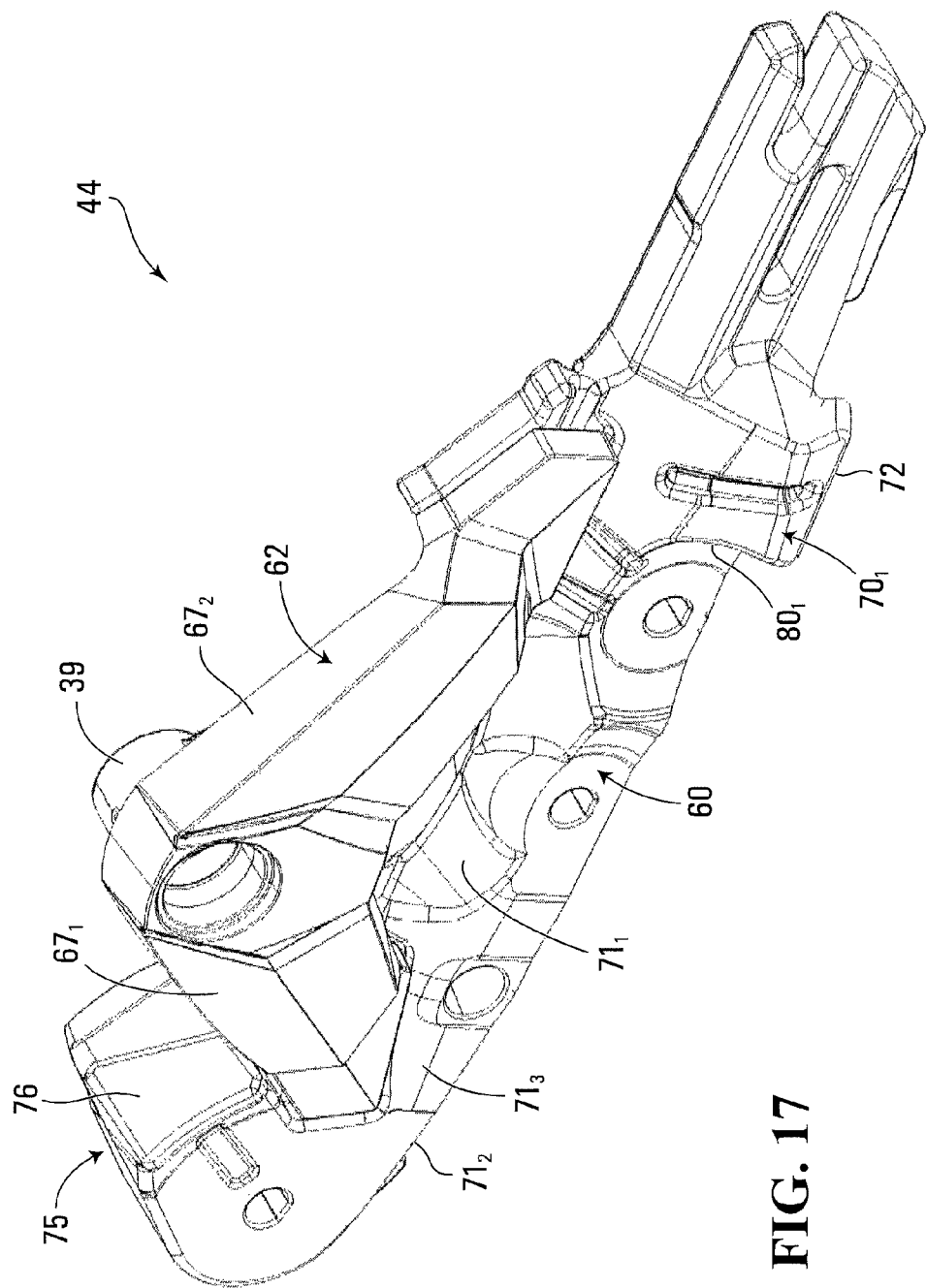
FIGS. 17 and 19 respectively show a perspective view and a side view of a frame of the rear track assembly.
Figure 18:
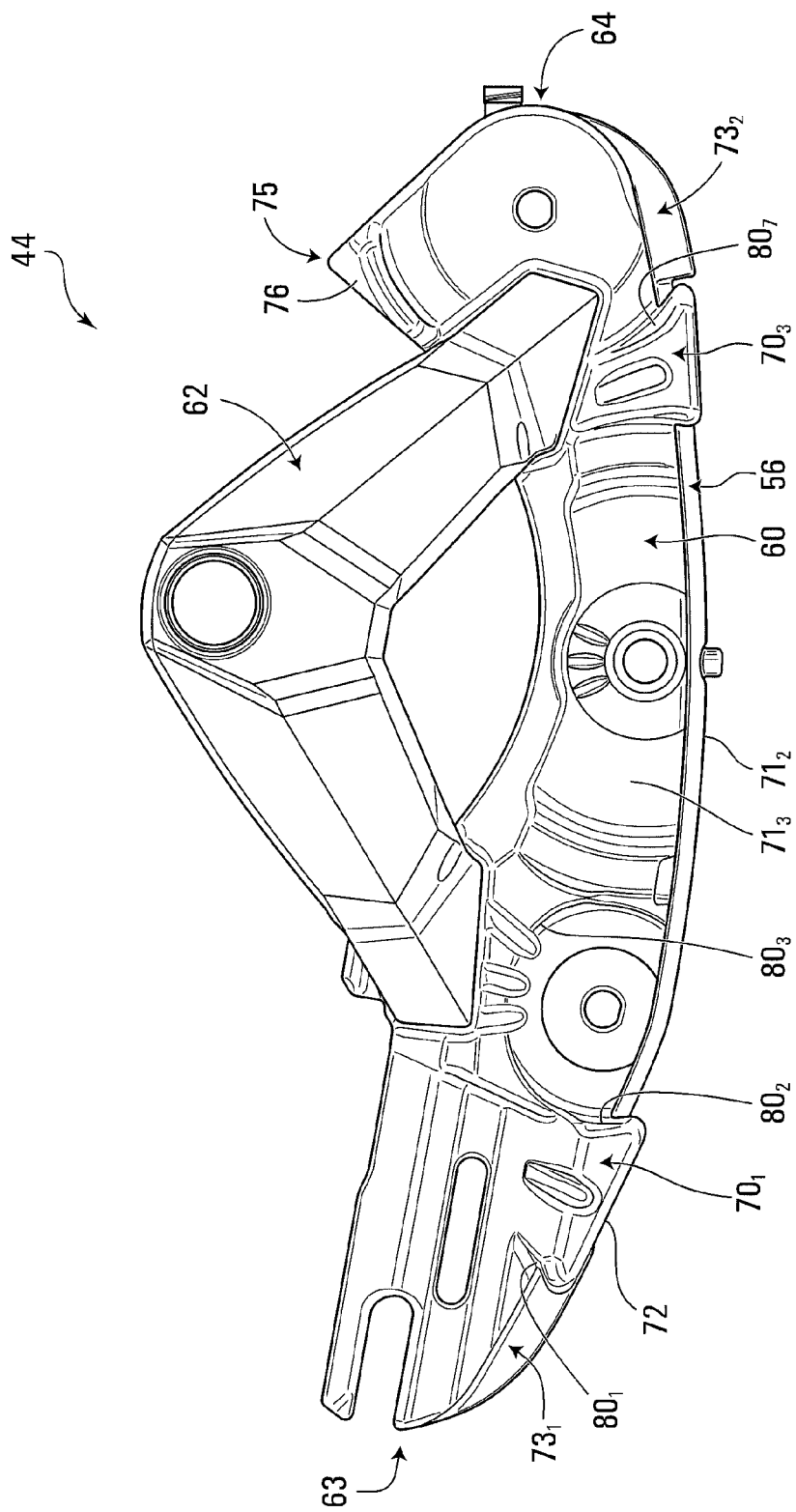
Figure 19:
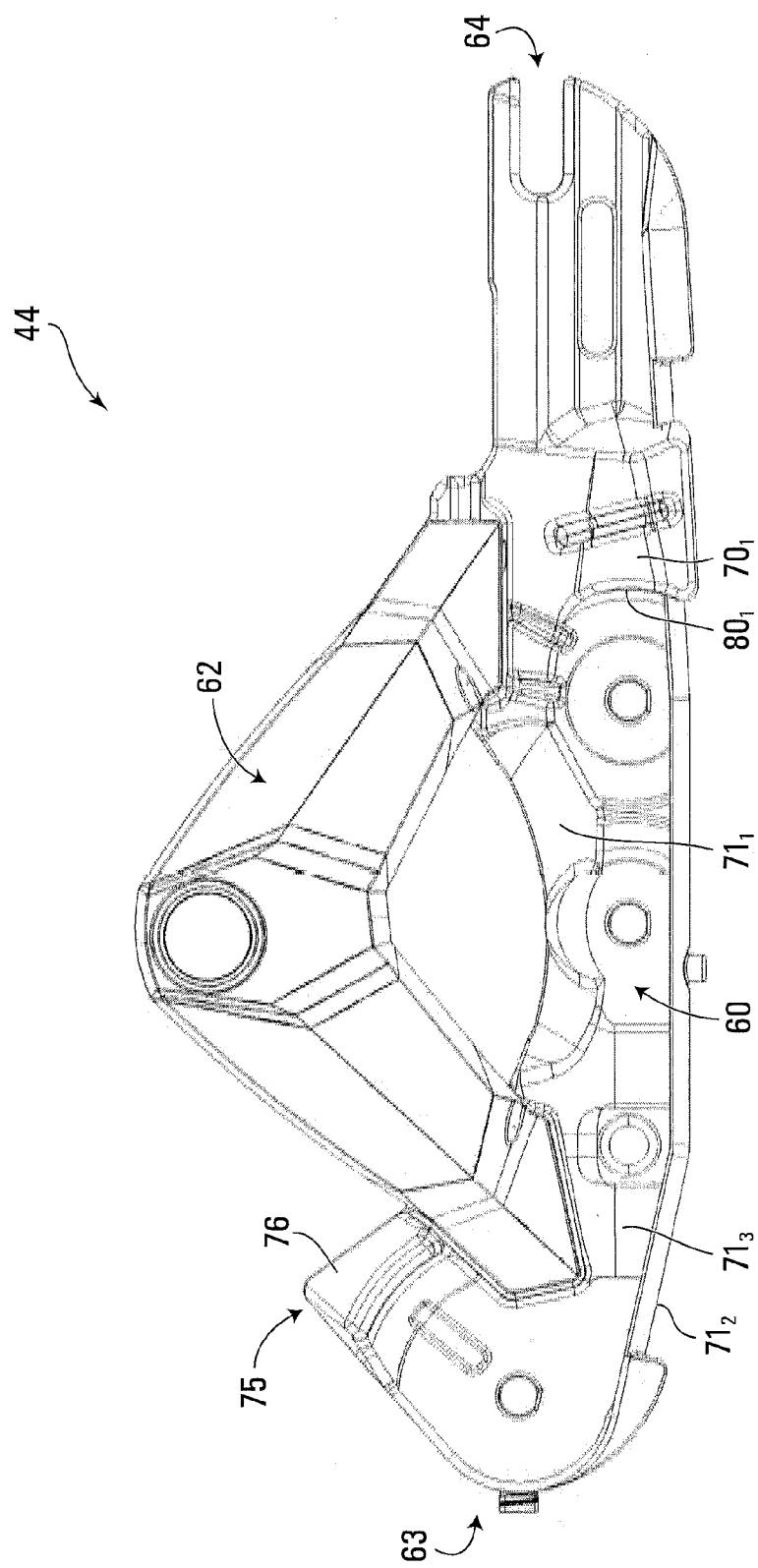

With additional reference to FIGS. 14 and 15, the endless track 41 comprises a body 36 underlying its inner side 45 and its ground-engaging outer side 47. In view of its underlying nature, the body 36 can be referred to as a "carcass". In this embodiment, the body 36 is an elastomeric body in that it comprises elastomeric material which allows the track 41 to elastically change in shape as it is in motion around the wheels 42, $50_1$-$50_{10}$. The elastomeric material of the carcass 36 can be any polymeric material with suitable elasticity. In this embodiment, the elastomeric material includes rubber. Various rubber compounds may be used and, in some cases, different rubber compounds may be present in different areas of the carcass 36. In other embodiments, the elastomeric material of the carcass 36 may include another elastomer in addition to or instead of rubber (e.g., polyurethane elastomer).

Also, in this embodiment, the carcass 36 comprises a plurality of reinforcements embedded in its elastomeric material 38. One example of a reinforcement is a layer of reinforcing cables that are adjacent to one another and that extend in the longitudinal direction of the track 41 to enhance strength in tension of the track 41 along its longitudinal direction. In some cases, a reinforcing cable may be a cord or wire rope including a plurality of strands or wires. In other cases, a reinforcing cable may be another type of cable and may be made of any material suitably flexible longitudinally (e.g., fibers or wires of metal, plastic or composite material). Another example of a reinforcement is a layer of reinforcing fabric. Reinforcing fabric comprises pliable material made usually by weaving, felting, or knitting natural or synthetic fibers. For instance, a layer of reinforcing fabric may comprise a ply of reinforcing woven fibers (e.g., nylon fibers or other synthetic fibers). Various other types of reinforcements may be provided in the carcass 36 in other embodiments.

In this embodiment, the inner side 45 of the endless track 41 comprises a plurality of inner projections $48_1$-$48_N$ that contact at least some of the wheels 42, $50_1$-$50_{10}$ and that are used to do at least one of driving (i.e., imparting motion to) the track 41 and guiding the track 41. In that sense, the inner projections $48_1$-$48_N$ can be referred to as "drive/guide projections", meaning that each drive/guide projection is used to do at least one of driving the track 41 and guiding the track 41. Also, such drive/guide projections are sometimes referred to as "drive/guide lugs" and will thus be referred to as such herein. More particularly, in this embodiment, the drive/guide lugs $48_1$-$48_N$ interact with the drive wheel 42 in order to cause the track 41 to be driven, and also interact with the idler wheels $50_1$-$50_{10}$ in order to guide the track 41 as it is driven by the drive wheel 42. The drive/guide lugs $48_1$-$48_N$ are thus used to both drive the track 41 and guide the track 41 in this embodiment.

The drive/guide lugs $48_1$-$48_N$ are spaced apart along the longitudinal direction of the endless track 41. In this case, the drive/guide lugs $48_1$-$48_N$ are arranged in a plurality of rows that are spaced apart along the widthwise direction of the endless track 41. The drive/guide lugs $48_1$-$48_N$ may be arranged in other manners in other embodiments.

In this example, each drive/guide lug $48_i$ is an elastomeric drive/guide lug in that it comprises elastomeric material. The elastomeric material of the drive/guide lug $48_i$ can be any polymeric material with suitable elasticity. More particularly, in this case, the elastomeric material of the drive/guide lug $48_i$ includes rubber. Various rubber compounds may be used and, in some cases, different rubber compounds may be present in different areas of the drive/guide lug $48_i$. In other cases, the elastomeric material of the drive/guide lug $48_i$ may include another elastomer in addition to or instead of rubber.

The ground-engaging outer side 47 comprises a plurality of traction projections $61_1$-$61_M$ (sometimes referred to as "traction lugs" or "traction profiles") that engage and may penetrate into the ground to enhance traction. The traction lugs $61_1$-$61_M$ are spaced apart along the longitudinal direction of the track assembly $16_i$.

In this example, each traction lug $61_i$ is an elastomeric traction lug in that it comprises elastomeric material. The elastomeric material of the traction lug $61_i$ can be any polymeric material with suitable elasticity. More particularly, in this case, the elastomeric material of the traction lug $61_i$ includes rubber. Various rubber compounds may be used and, in some cases, different rubber compounds may be present in different areas of the traction lug $61_i$. In other cases, the elastomeric material of the traction lug $61_i$ may include another elastomer in addition to or instead of rubber.

The endless track 41 may be constructed in various other manners in other embodiments. For example, in some embodiments, the track 41 may comprise a plurality of parts (e.g., rubber sections) interconnected to one another to form an endless belt, the track 41 may have recesses or holes that interact with the drive wheel 42 in order to cause the track 41 to be driven (e.g., in which case the drive/guide lugs $48_1$-$48_N$ may be used only to guide the track 41 without being used to drive the track 41), and/or the ground-engaging outer side 47 of the track 41 may comprise various patterns of traction projections.

The drive wheel 42 is rotatable about an axis of rotation 49 for driving the endless track 41. The axis of rotation 49 corresponds to an axle of the ATV 10. More particularly, in this example, the drive wheel 42 has a hub which is mounted to the axle of the ATV 10 such that power generated by the prime mover 12 and delivered over the powertrain of the ATV 10 rotates the axle, which rotates the drive wheel 42, which imparts motion of the track 41. In this embodiment in which the track assembly $16_i$ is mounted where a ground-engaging wheel $15_i$ could otherwise be mounted, the axle of the ATV 10 is capable of rotating the drive wheel 42 of the track assembly $16_i$ or the ground-engaging wheel $15_i$.

In this embodiment, the drive wheel 42 comprises a drive sprocket engaging the drive/guide lugs $48_1$-$48_N$ of the inner side 45 of the track 41 in order to drive the track 41. In this case, the drive sprocket 42 comprises a plurality of teeth $46_1$-$46_T$ distributed circumferentially along its rim and projecting axially along its axis of rotation 49 to define a plurality of lug-receiving spaces $40_1$-$40_S$ therebetween that receive the drive/guide lugs $48_1$-$48_N$ of the track 41. The drive wheel 42 may be configured in various other ways in other embodiments. For example, in embodiments where the track 41 comprises recesses or holes, the drive wheel 42 may have teeth that enter these recesses or holes in order to drive the track 41. As yet another example, in some embodiments, the drive wheel 42 may frictionally engage the inner side 45 of the track 41 in order to frictionally drive the track 41.

The idler wheels $50_1$-$50_{10}$ are not driven by power supplied by the prime mover 12, but are rather used to do at least one of supporting part of the weight of the ATV 10 on the ground via the track 41, guiding the track 41 as it is driven by the drive wheel 42, and tensioning the track 41. More particularly, in this embodiment, the idler wheels $50_1$, $50_2$ and the idler wheels $50_9$, $50_{10}$ are respectively front idler wheels (leading idler wheels) and rear idler wheels (trailing idler wheels) that maintain the track 41 in tension, and can help to support part of the weight of the ATV 10 on the ground via the track 41. The idler wheels $50_3$-$50_8$ are roller wheels that roll on the inner side 45 of the track 41 along the bottom run 66 of the track 41 to apply the bottom run 66 on the ground. The idler wheels $50_1$-$50_{10}$ may be arranged in other configurations and/or the track assembly $16_i$ may comprise more or less idler wheels in other embodiments.

The frame 44 supports components of the track assembly $16_i$, including the idler wheels $50_1$-$50_{10}$. More particularly, in this embodiment, the front idler wheels $50_1$, $50_2$ are mounted to the frame 44 in a front longitudinal end region of the frame 44 proximate the front longitudinal end 57 of the track assembly $16_i$, with each of these front idler wheels being located on a respective one of a first lateral side $30_1$ and a second lateral side $30_2$ of the frame 44. The rear idler wheels $50_9$, $50_{10}$ are mounted to the frame 44 in a rear longitudinal end region of the frame 44 proximate the rear longitudinal end 59 of the track assembly $16_i$, with each of these rear idler wheels being located on a respective one of the lateral sides $30_1$, $30_2$ of the frame 44. The roller wheels $50_3$-$50_8$ are mounted to the frame 44 in a central region of the frame 44 between the front idler wheels $50_1$, $50_2$ and the rear idler wheels $50_9$, $50_{10}$. The roller wheels $50_3$-$50_5$ are located on the lateral side $30_1$ of the frame 44, while the roller wheels $50_6$-$50_8$ are located on the lateral side $30_2$ of the frame 44. Each of the roller wheels $50_3$-$50_8$ may be rotatably mounted directly to the frame 44 or may be rotatably mounted to a link which is pivotally mounted to the frame 44 to which is rotatably mounted an adjacent one of the roller wheels $50_3$-$50_8$, thus forming a "tandem". For instance, in this case, the roller wheel $50_3$ is rotatably mounted directly to the frame 44, while the roller wheels $50_4$, $50_5$ are rotatably mounted to a link 17 that is pivotally mounted to the frame 44 such that the roller wheels $50_4$, $50_5$ and their link 17 can pivot in tandem relative to the frame 44.

The frame 44 is supported at a support area 39. More specifically, in this case, the frame 44 is supported by the axle of the ATV 10 to which is coupled the drive wheel 42, such that the support area 39 is intersected by the axis of rotation 49 of the drive wheel 42.

In this embodiment, the frame 44 is pivotable about a pivot axis 51 to facilitate motion of the track assembly $16_i$ on uneven terrain and enhance its traction on the ground. More particularly, in this embodiment, the pivot axis 51 corresponds to the axis of rotation 49 of the drive wheel 42 and the frame 44 can pivot about the axle of the ATV 10 to which the drive wheel 42 is coupled. In other embodiments, the pivot axis 51 of the frame 44 may be located elsewhere (e.g., lower) than the axis of rotation 49 of the drive wheel 42. In yet other embodiments, the frame 44 may not be pivotable.

Also, in this embodiment, the track assembly $16_i$ comprises an anti-rotation connector 52 to limit a pivoting movement of the track assembly $16_i$ relative to a chassis of the ATV 10. In this example, the anti-rotation connector 52 comprises a spring and a damper and is connected between the frame 44 of the track assembly $16_i$ and the chassis of the ATV 10 (e.g., via one or more mounting brackets and/or fasteners).

With additional reference to FIGS. 16 to 19, in this embodiment, the frame 44 comprises a lower frame structure 60 and an upper frame structure 62 extending upwardly from the lower frame structure 60.

The lower frame structure 60 defines a front longitudinal end 63 and a rear longitudinal end 64 of the frame 44. That is, the lower frame structure 60 has a length which extends from the front longitudinal end 63 to the rear longitudinal end 64 of the frame 44. The lower frame structure 60 forms a frame base. In this case, the lower frame structure 60 supports the idler wheels $50_1$-$50_{10}$ and therefore forms a wheel-supporting frame base.

In this embodiment, the lower frame structure 60 comprises a plurality of surfaces, including a top surface $71_1$, a bottom surface $71_2$, and a pair of lateral surfaces $71_3$, $71_4$ opposite one another. The top surface $71_1$ faces the drive wheel 42, the bottom surface $71_2$ faces the bottom run 66 of the endless track 41, and the lateral surfaces $71_3$, $71_4$ face respective ones of the idler wheels $50_1$-$50_{10}$.

In this embodiment, the lower frame structure 60 is relatively voluminous and occupies a significant space within the track assembly $16_i$ in order to impede accumulation of unwanted ground matter (i.e., mud, rocks, soil, ice, snow, and/or other debris on the ground) within the track assembly $16_i$, while remaining lightweight. In addition, in this embodiment, the lower frame structure 60 is configured to provide various structural features (e.g., guides for the endless track 41) enhancing performance of the track assembly $16_i$.

For example, in this embodiment, the lower frame structure 60 extends relatively high within the track assembly $16_i$. For instance, in this embodiment, the lower frame structure 60 extends at least as high, and in some cases higher, than some of the idler wheels $50_1$-$50_{10}$. The lower frame structure 60 extends as high or higher than an idler wheel $50_i$ if a point of the lower frame structure 60 aligned with a top of the idler wheel $50_i$ in the longitudinal direction of the track assembly $16_i$ is located as high or higher than the top of the idler wheel $50_i$. For example, in this embodiment, the lower frame structure 60 extends as high as the roller wheel $50_5$ and higher than the roller wheels $50_3$, $50_4$, $50_6$, $50_7$.

Also, in this embodiment, a cross-sectional shape of the lower frame structure 60 changes along the longitudinal direction of the track assembly $16_i$. For example, in this embodiment, a height of the cross-sectional shape of the lower frame structure 60 (measured in the height direction of the track assembly $16_i$) varies along the longitudinal direction of the track assembly $16_i$. In addition, in this embodiment, a width of the cross-sectional shape of the lower frame structure 60 (measured in the widthwise direction of the track assembly $16_i$) varies along the longitudinal direction of the track assembly $16_i$.

For instance, in this embodiment, the cross-sectional shape of the lower frame structure 60 varies such that the top surface $71_1$ of the lower frame structure 60 is concave to conform to the drive wheel 42. This may allow a gap between the top surface $71_1$ of the lower frame structure 60 and the drive wheel 42 to be minimized. This also allows the lower frame structure 60 to extend as high or higher than some of the idler wheels idler wheels $50_1$-$50_{10}$, as discussed above. Also, in this embodiment, the cross-sectional shape of the lower frame structure 60 varies such that the bottom surface $71_2$ and the lateral surfaces $71_3$, $71_4$ of the lower frame structure 60 form structural features (e.g., guides for the endless track 41), as will be further discussed later on.

The upper frame structure 62 extends upwardly from the lower frame structure 60 to a top of the frame 44. Thus, the upper frame structure 62 extends between the lower frame structure 60 and the support area 39, and in this case the pivot axis 51, of the frame 44. Along the longitudinal direction of the track assembly $16_i$, the upper frame structure 62 is shorter than the lower frame structure 60. In this embodiment, the upper frame structure 62 forms an upper frame link between the support area 39 of the frame 44 and the wheel-supporting frame base formed by the lower frame structure 60. More particularly, in this embodiment, the upper frame structure 62 comprises a pair of frame members $67_1$, $67_2$ that are angled relative to one another and converge upwardly, in this case towards the pivot axis 51 of the frame 44, giving to the upper frame structure 62 a generally triangular or inverted V-shaped configuration.

The frame 44 is made one or more materials providing strength and rigidity to the frame 44. A material making up a portion of the frame 44 is one which imparts strength and rigidity to that portion of the frame 44. In some cases, a single material may make up an entirety of the frame 44. In other cases, different materials may make up different portions of the frame 44.

In this embodiment, the lower frame structure 60 is a nonmetallic frame structure. The lower frame structure 60 is nonmetallic in that it is at least mainly (i.e., it is mostly or entirely) made of nonmetal. That is, nonmetal is a sole or main constituent of the lower frame structure 60. Metal is not a main constituent of the lower frame structure 60.

More particularly, in this embodiment, the lower frame structure 60 is a polymeric frame structure. The lower frame structure 60 is polymeric in that it is at least mainly (i.e., it is mostly or entirely) made of polymer. In some cases, the polymeric lower frame structure 60 may include a single polymer. In other cases, the polymeric lower frame structure 60 may include a combination of polymers. In yet other cases, the polymeric lower frame structure 60 may include a polymer-matrix composite comprising a polymer matrix in which reinforcements are embedded (e.g., a fiber-reinforced polymer such as a carbon-fiber-reinforced polymer or glass-fiber-reinforced polymer). In this example of implementation, the polymeric lower frame structure 60 includes high-density polyethylene. Any other suitable polymer may be used in other examples of implementation (e.g., polypropylene, polyurethane, polycarbonate, low-density polyethylene, nylon, etc.).

Figure 20:
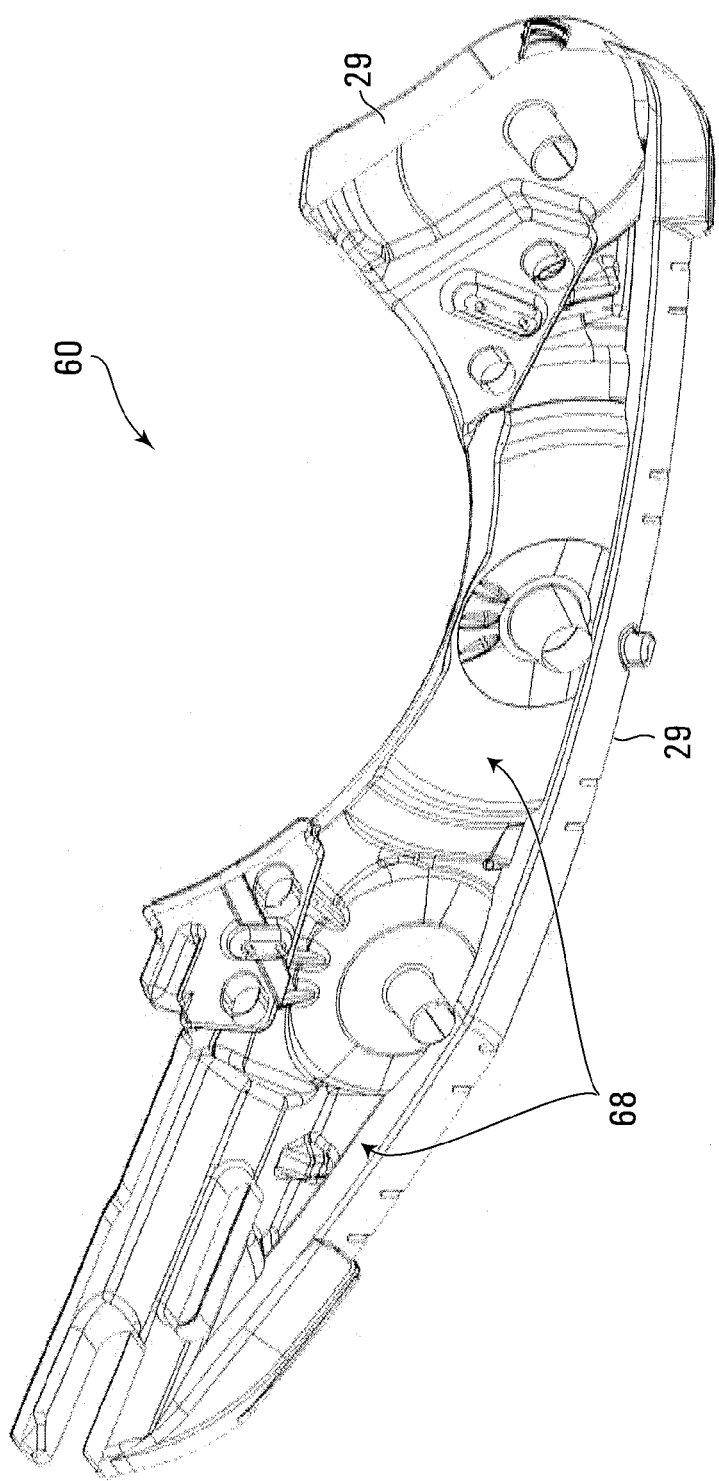
FIG. 20 shows a longitudinal sectional view of a lower frame structure of the frame.
Figure 21:
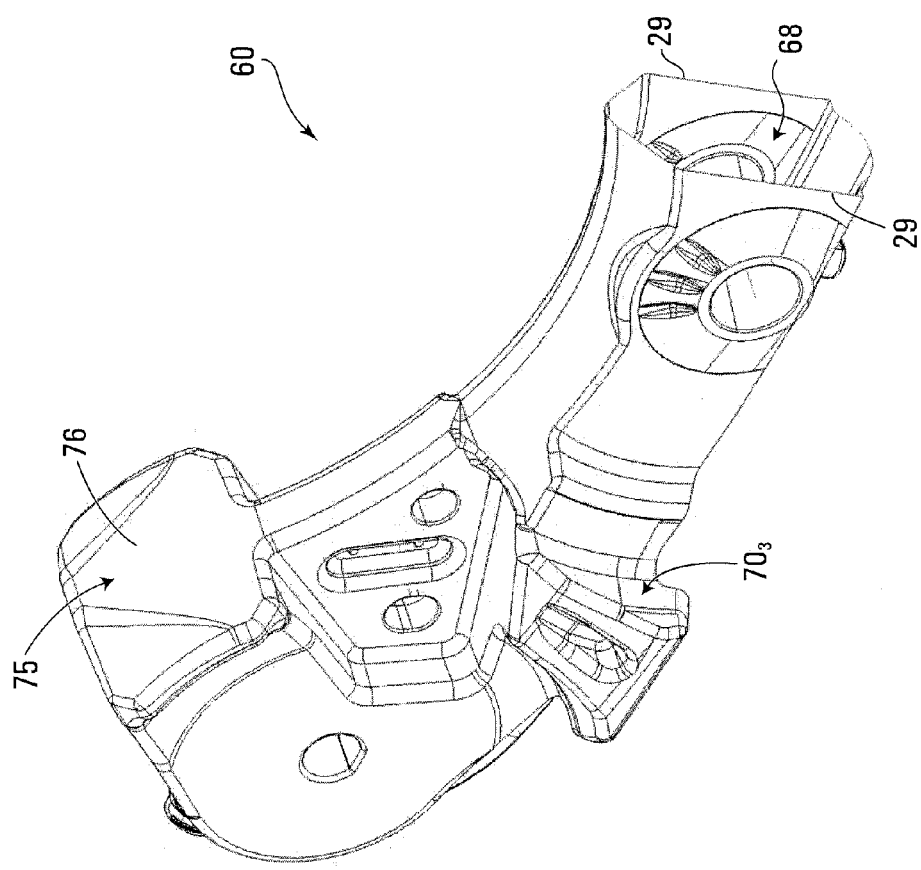
FIGS. 21 and 22 respectively show different cross-sectional views of the frame.
Figure 22:
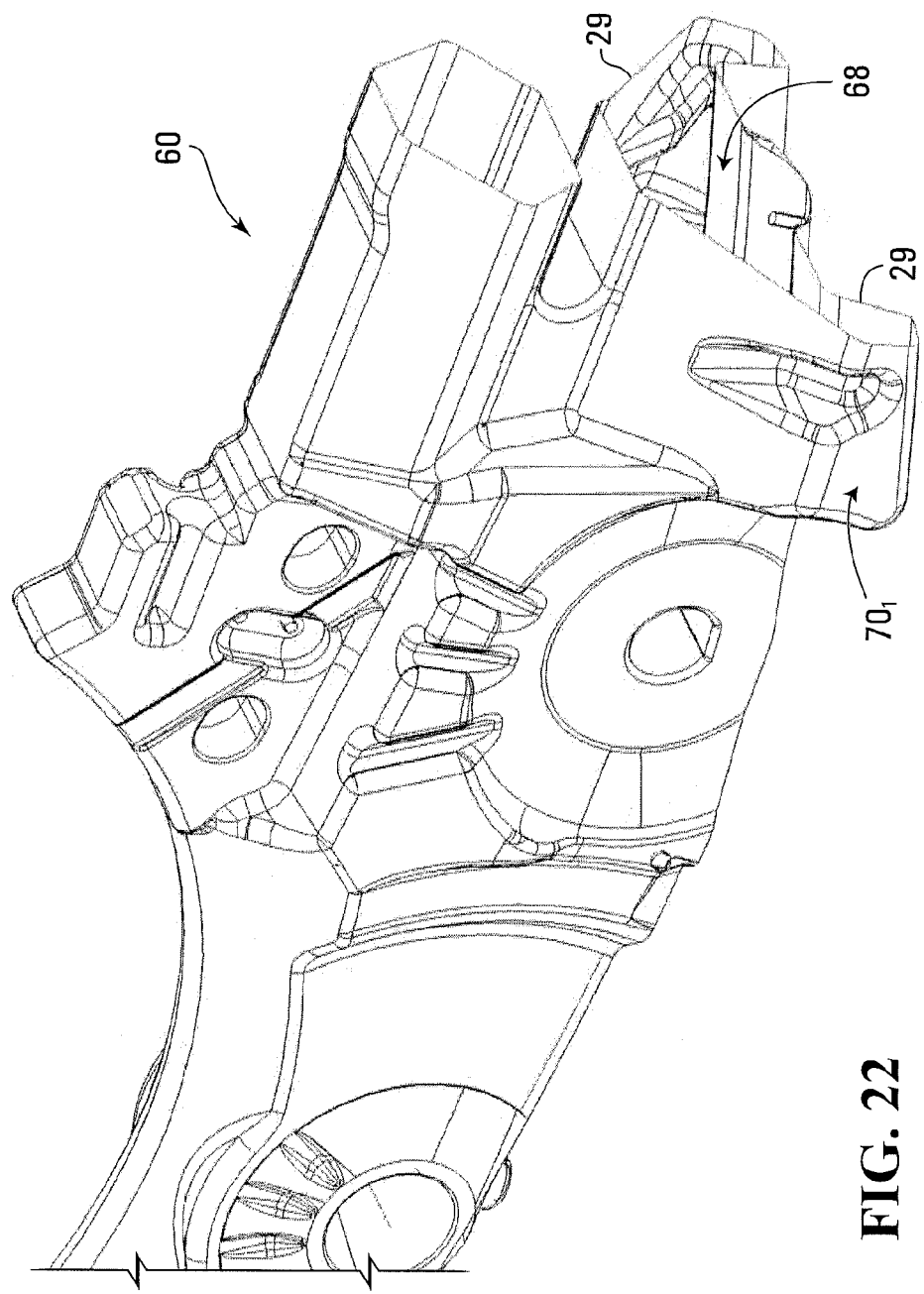

With additional reference to FIGS. 20 to 22, in this embodiment, the lower frame structure 60 is a hollow frame structure. That is, the lower frame structure 60 comprises a hollow interior 68. More particularly, in this embodiment, the hollow interior 68 occupies a majority of a volume of the lower frame structure 60. The hollow interior 68 therefore occupies at least 50%, in some cases at least 65%, in some cases at least 80%, and in some cases an even greater proportion of the volume of the lower frame structure 60. In other embodiments, the hollow interior 68 may occupy a smaller proportion of the volume of the lower frame structure 60. This hollowness of the lower frame structure 60 helps to reduce a weight of the frame 44. In this case, as further discussed later, the hollowness of the lower frame structure 60 is created during molding of the lower frame structure 60.

The hollow interior 68 is defined by a wall 29 of the lower frame structure 60. The wall 29 encloses the hollow interior 68 such that the hollow interior 68 is closed. This prevents mud, rocks, debris and/or other undesirable ground matter from entering into the hollow interior 68 of the lower frame structure 60.

The wall 29 has a thickness suitable for providing sufficient rigidity to the lower frame structure 60. This depends on the material making up the lower frame structure 60 and on loads to which the lower frame structure 60 is expected to be subjected to. For example, in some embodiments, the thickness of the wall 29 may be at least 1 mm, in some cases at least 2 mm, in some cases at least 3 mm, and in some cases at least 4 mm. For instance, in this example of implementation in which the wall 29 includes high-density polyethylene, the thickness of the wall 29 may be between 1 mm and 5 mm. In cases in which the thickness of the wall 29 varies such that it takes on different values in different regions of the lower frame structure 60, the thickness of the wall 29 may be taken as its minimum thickness. In other cases, the thickness of the wall 29 may be generally constant over an entirety of the lower frame structure 60.

In this embodiment, the track assembly $16_i$ comprises a plurality of interwheel guides $70_1$-$70_4$ for contacting the endless track 41 during use to maintain a desired shape of the track 41. More particularly, in this embodiment, the interwheel guides $70_1$-$70$ are disposed to come into contact with the bottom run 66 of the track 41 during use (e.g., when the bottom run 66 of the track 41 engages a rock, bump, etc., on the ground), thereby forming "bumpers" or "abutments" against which the bottom run 66 of the track 41 may abut. Each interwheel guide $70_i$ is located between adjacent ones of the idler wheels $50_1$-$50_{10}$ which are adjacent to one another along the longitudinal direction of track assembly $16_i$. By contacting a given section of the endless track 41 that is between the adjacent ones of the idler wheels $50_1$-$50_{10}$ between which it is located, the interwheel guide $70_i$ helps to maintain a desired shape of the given section of the track 41 by countering a tendency of the given section of the track 41 to curve inwardly in a gap that would otherwise exist between these adjacent ones of the idler wheels if the interwheel guide $70_i$ was omitted (e.g., when the given section of the track 41 bears against a rock, a bump, etc., on the ground). Also, in this embodiment, when the track assembly $16_i$ experiences large lateral forces, the interwheel guides $70_1$-$70_4$ may contact some of the drive/guide lugs $48_1$-$48_N$ to oppose a tendency of the track 41 to detrack laterally. In addition, in this embodiment, when a lateral edge portion of the track 41 tends to bend inwardly (e.g., due to a rock, a bump, etc., on the ground), the interwheel guides $70_1$-$70_4$ may prevent the lateral edge portion of the track 41 from bending to such a degree that it engages lateral faces of some of the idler wheels $50_1$-$50_{10}$. As further discussed later, in this embodiment, the interwheel guides $70_1$-$70_4$ are integrally formed with the lower frame structure 60 during molding of the lower frame structure 60.

More particularly, in this embodiment, the interwheel guide $70_1$ is located between the front idler wheel $50_1$ and the roller wheel $50_3$ and comprises a track-contacting surface 72 to contact the endless track 41 during use. In this example, the track-contacting surface 72 is elongated in the longitudinal direction of the track assembly $16_i$. With additional reference to FIG. 23, in this case, the track-contacting surface 72 has a point $P_s$ located, along the widthwise direction of the track assembly $16_i$, where a point $P_w$ of a circumferential surface 74 of each of the front idler wheel $50_1$ and the roller wheel $50_3$ is located. Also, in this case, the track-contacting surface 72 is generally parallel to a line T tangent to the front idler wheel $50_1$ and the roller wheel $50_3$. This creates a guiding effect which acts to maintain a desired shape of a section 53 of the endless track 41 between the front idler wheel $50_1$ and the roller wheel $50_3$. More specifically, in this example, the shape of the section 53 of the endless track 41 is maintained such that the section 53 of the endless track 41 remains generally parallel to the line T tangent to the front idler wheel $50_1$ and the roller wheel $50_3$.

The interwheel guides $70_2$-$70_4$ are configured in a manner similar to that described above in respect of the interwheel guide $70_1$.

Each of the interwheel guides $70_1$-$70_4$ may be configured in various other ways in other embodiments. For example, in some embodiments, the track-contacting surface 72 of an interwheel guide $70_i$ may not be parallel to the line T tangent to the adjacent ones of the idler wheels $50_1$-$50_{10}$ between which the interwheel guide $70_i$ is located.

In this embodiment, the track assembly $16_i$ comprises a plurality of fenders $80_1$-$80_8$ adjacent to respective ones of the idler wheels $50_1$-$50_8$. The fenders $80_1$-$80_8$ may help to protect against large rocks or other ground objects becoming trapped into the track assembly $16_i$ (e.g., between the frame 44 and an idler wheel $50_i$, between the frame 44 and the drive wheel 42, between the frame 44 and the endless track 41, and/or between any other moving and static components of the track assembly $16_i$). In addition, in this case, the fenders $80_1$-$80_8$ occupy space within the track assembly $16_i$ which would otherwise (i.e., if they were omitted) be available for unwanted ground matter to accumulate in. In this embodiment, a fender $80_i$ may be contiguous to an interwheel guide $70_i$ (e.g., the fender $80_2$ is contiguous to the interwheel guide $70_1$) or may not be contiguous to any of the interwheel guides $70_1$-$70_4$ (e.g., the fender $80_3$ is not contiguous to any of the interwheel guides $70_1$-$70_4$). As further discussed later, in this embodiment, the fenders $80_1$-$80_8$ are integrally formed with the lower frame structure 60 during molding of the lower frame structure 60.

More particularly, in this embodiment, the fender $80_3$ is adjacent to the roller wheel $50_3$. The fender $80_3$ is configured to generally conform to a contour of the roller wheel $50_3$. Basically, the fender $80_3$ has a wheel-facing surface 81 that faces the roller wheel $50_3$ and that is concave to accommodate the contour of the roller wheel $50_3$. In this case, the wheel-facing surface 81 of the fender $80_3$ is curved to generally conform to the contour of the roller wheel $50_3$. In other cases, the wheel-facing surface 81 of the fender $80_3$ may have one or more straight segments and/or one or more curved segments arranged to generally conform to the contour of the roller wheel $50_3$.

A gap between the wheel-facing surface 81 of the fender $80_3$ and the roller wheel $50_3$ may be dimensioned to prevent entry into the gap of large rocks, which, if trapped in the track assembly $16_i$, could be problematic. For example, in some embodiments, the gap may have a size (e.g., 5 mm or any other suitable size) which corresponds to a size of a rock which is considered to be insufficient to block the roller wheel $50_3$ if it were to enter through the gap. In some cases, the gap may vary in size along the fender $80_3$ (e.g, increase from 5 mm to 6 mm and then to 7 mm near a center of the roller wheel $50_3$). For instance, an increase in size of the gap may facilitate egress of smaller rocks which would enter the gap. In such cases, the size of the gap can be taken as a minimum value of the size of the gap.

The fenders $80_1$, $80_2$, $80_4$-$80_8$ are configured in a manner similar to that described above in respect of the fenders $80_2$, $80_3$.

Each of the fenders $80_1$-$80_8$ may be configured in various other ways in other embodiments. For example, in some embodiments, each of the fenders $80_1$-$80_8$ may have various other shapes that follow a greater or lesser part of the contour of a respective one of the idler wheels $50_1$-$50_8$ to which it is adjacent.

In this embodiment, the lower frame structure 60 also comprises a deflector 75 for deflecting unwanted ground matter which would enter the track assembly $16_i$ in order to reduce unwanted ground matter accumulation in the track assembly $16_i$. For example, in some cases, unwanted ground matter may be transported by the endless track 41 (e.g., by the drive/guide lugs $48_1$-$48_N$) and, as it reaches the rear region of the track assembly $16_i$ where the track 41 turns about the rear idler wheels $50_1$, $50_9$, it may fall from the track 41 and be deflected outside of the track assembly $16_i$ by the deflector 75. In this embodiment, the deflector 75 includes a deflecting surface 76 which is oriented so as to deflect unwanted ground matter towards the lateral sides of the track assembly $16_i$. More particularly, in this example, the deflecting surface 76 includes two opposite surface portions that diverge from one another downwardly to facilitate deflection of unwanted ground matter towards the lateral sides of the track assembly $16_i$. The deflector 75 may be configured in various other ways in other embodiments.

The lower frame structure 60 may be manufactured in various manners. In this embodiment, the lower frame structure 60 is molded into shape such that it is a molded frame structure. In particular, in this case, the hollowness, the interwheel guides $70_1$-$70_4$ and the fenders $80_1$-$80_8$ of the lower frame structure 60 are realized during molding of the lower frame structure 60.

Figure 25:
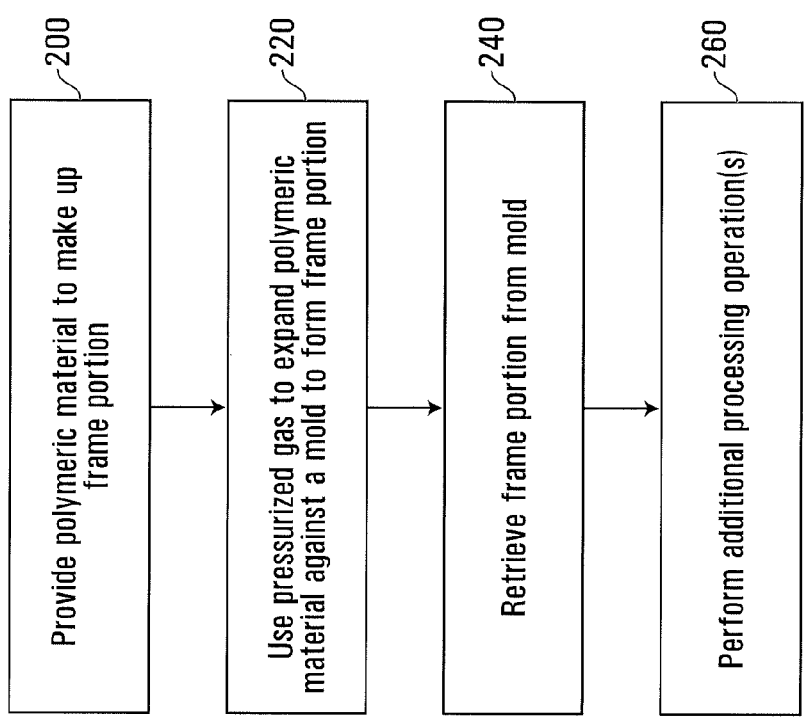
FIG. 25 is a flowchart illustrating an example of a blow-molding process used to mold the lower frame structure.

More specifically, in this embodiment, the lower frame structure 60 is blow-molded into shape such that it is a blow-molded frame structure. For instance, FIG. 25 is a flowchart illustrating an example of a blow-molding process used to mold the lower frame structure 60.

At step 200, polymeric material that will make up the lower frame structure 60 is provided. For instance, in some cases, the polymeric material may be provided as a preform (also sometimes called "parison"), which is essentially a hot hollow tube of polymeric material. In other cases, the polymeric material may be provided as one or more hot sheets.

At step 220, pressurized gas (e.g., compressed air) is used to expand the polymeric material against a mold. The mold has an internal shape generally corresponding to the shape of the lower frame structure 60 such that, as it is expanded against the mold, the polymeric material is shaped into the lower frame structure 60. In this embodiment, this creates the hollow interior space 68, the interwheel guides $70_1$-$70_4$ and the fenders $80_1$-$80_8$ of the lower frame structure 60. Pressure is held until the polymeric material cools and hardens.

At step 240, once the polymeric material has cooled and hardened, the lower frame structure 60 is retrieved from the mold.

At optional step 260, one or more additional operations (e.g., trimming) may be performed on the lower frame structure 60 which has been molded.

In this embodiment, the upper frame structure 62 is a metallic frame structure. Strength and rigidity of the metallic material making up the upper frame structure 62 makes the upper frame structure 62, including the support area 39 of the frame 44 (at the axle of the ATV 10 to which is coupled the drive wheel 42), strong and rigid. In particular, in this embodiment, the upper frame structure 62 is more rigid than the lower frame structure 60.

More particularly, in this example of implementation, the metallic material making up the upper frame structure 62 includes aluminum. This provides strength and rigidity to the upper frame structure 62 while keeping it lightweight. Any other suitable metal may be used in other examples of implementation (e.g., steel). In this case, the upper frame structure 62 is cast into shape. The upper frame structure 62 may be manufactured using other techniques in other cases (e.g., machining, welding, etc.).

In this embodiment, the anti-rotation connector 52 is mounted to the upper frame structure 62. Strength and rigidity of the metallic material making up the upper frame structure 62 provides a strong and rigid mounting point for the anti-rotation connector 52. In other embodiments, the anti-rotation connector 52 may be mounted to the lower frame structure 60.

Figure 24:
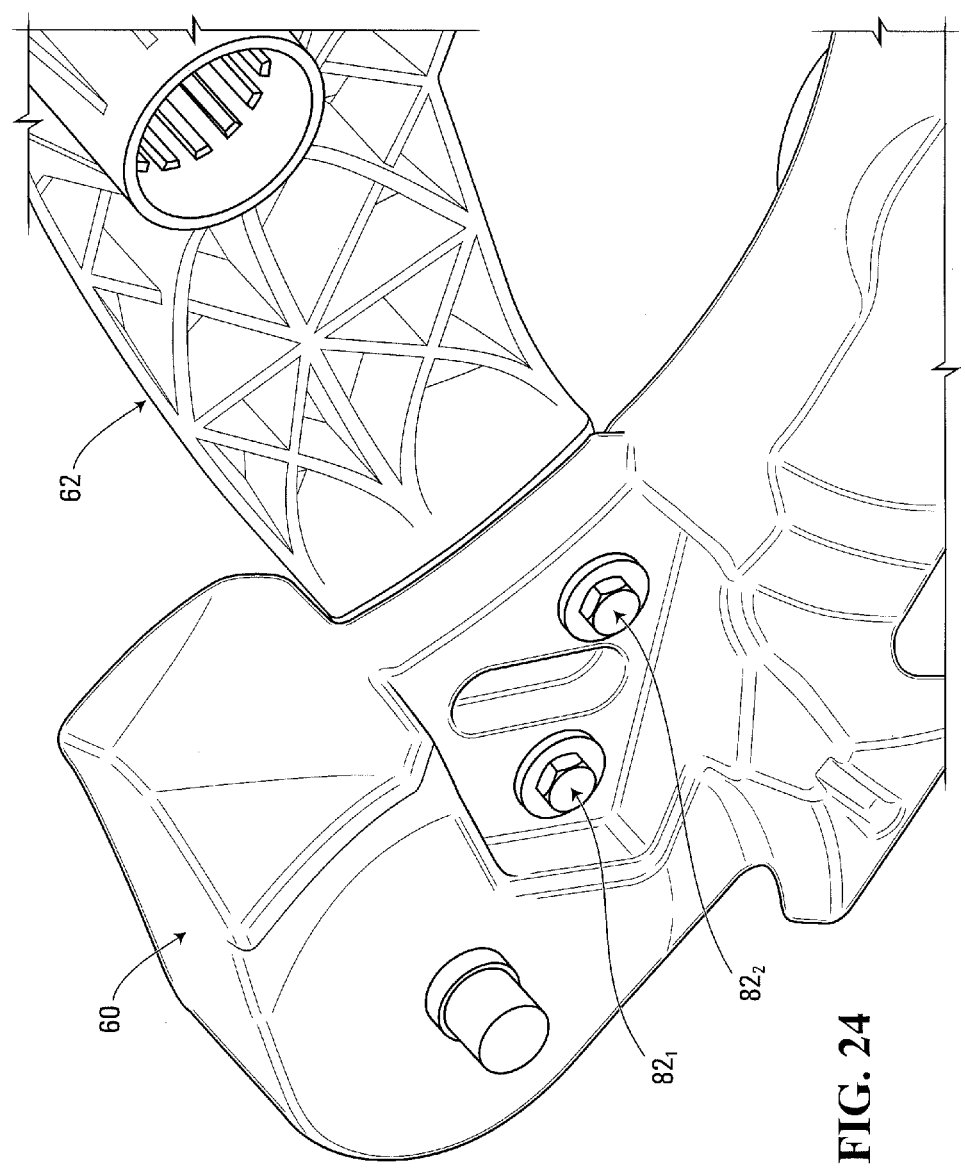
FIG. 24 shows a perspective view showing an interconnection of an upper frame structure and a lower frame structure of the frame.

Since they are separately made in this embodiment, the upper frame structure 62 and the lower frame structure 60 are secured to one another. More particularly, in this embodiment, as shown in FIG. 24, the upper frame structure 62 and the lower frame structure 60 are fastened to one another by a plurality of fasteners $82_1$-$82_F$ (e.g., bolts, screws, etc.). In this case, the upper frame structure 62 and the lower frame structure 60 are connected to one another such that they remain immobile relative to one another during use. In other cases, the upper frame structure 62 and the lower frame structure 60 may be connected to one another such that they are movable (e.g., pivotable) relative to one another during use.

Figure 23:
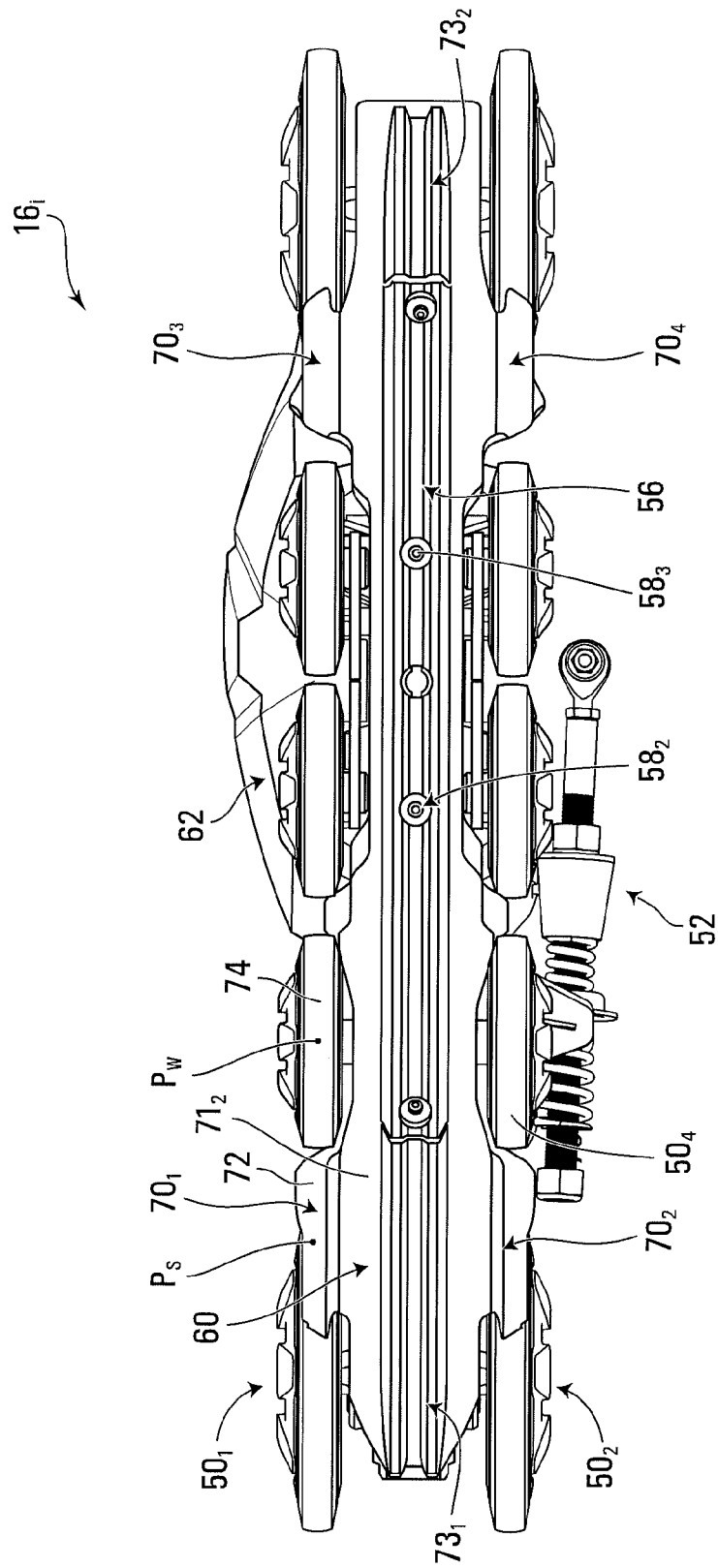
FIG. 23 shows a bottom view of the front track assembly without its endless track.

As shown in FIG. 23, in this embodiment, the track assembly $16_i$ comprises a bottom slider 56 facing the bottom surface $71_2$ of the lower frame structure 60 to slide against the endless track 41 during use.

More particularly, in this embodiment, the bottom slider 56 is separate from and removably mounted to the frame 44. In other words, the bottom slider 56 is a removable bottom slider. Specifically, in this case, the bottom slider 56 is fastened to the frame 44 by fasteners $58_1$-$58_4$. This allows the bottom slider 56 to be removed and possibly replaced by a new bottom slider, for instance, when the bottom slider 56 is worn out or damaged. The bottom slider 56 may have a low coefficient of friction with the endless track 41 and suitable wear resistance. For example, in this embodiment, the bottom slider 56 is at least partly made of polymeric material. In this example of implementation, the polymeric material of the bottom slider 56 includes high-density polyethylene. Any other suitable polymer may be used in other examples of implementation (e.g., low-density polyethylene, nylon, etc.).

In this embodiment, the bottom surface $71_2$ of the lower frame structure 60 includes a front track-contacting projection $73_1$ and a rear track-contacting projection $73_2$ that are aligned with the bottom slider 56. The track-contacting projections $73_1$, $73_2$ act as front and rear bottom sliders, assist in retaining the bottom slider 56 in place, and limit the length of the bottom slider 56 which may need to be replaced when worn out or damaged. In this case, the track-contacting projections $73_1$, $73_2$ are formed during molding of the lower frame structure 60.

In other embodiments, the bottom slider 56 may be formed during molding of the lower frame structure 60 such that it is an integral part of the frame 44.

The frame 44 is thus constructed in this embodiment to enhance the performance of the track assembly $16_i$. For example, due to the hollowness of its lower frame structure 60, the frame 44 may be voluminous yet lightweight, thus helping to contain an overall weight of the track assembly $16_i$. As another example, by being voluminous, the lower frame structure 60 occupies space within the track assembly $16_i$ which would otherwise be available for unwanted ground matter (i.e., mud, rocks, soil, ice, snow, and/or other debris) to accumulate in, and, therefore, helps to reduce a potential for unwanted ground matter accumulation in the track assembly $16_i$. As yet another example, the upper frame structure 62 provides a rigid structure which may enhance driving precision, while the lower frame structure 60 provides a less rigid, more resilient structure which may be beneficial when the track assembly $16_i$ experiences strong impacts in use. As yet another example, the interwheel guides $70_1$-$70_4$, the fenders $80_1$-$80_8$ and the deflector 75 contribute to improving the performance of the endless track 41 and the idler wheels $50_1$-$50_{10}$.

Although it is configured in a certain manner in this embodiment, the frame 44 may be configured in various other manners in other embodiments.

For example, while the lower frame structure 60 and the upper frame structure 62 have certain shapes in this embodiment, the lower frame structure 60 and/or the upper frame structure 62 may have various other shapes in other embodiments.

As another example, although in this embodiment the lower frame structure 60 is blow-molded, in other embodiments, the lower frame structure 60 may be manufactured using other manufacturing processes. For example, in some embodiments, the lower frame structure 60 may be manufactured by a rotational molding (sometimes also referred to as "rotomolding") process in which a heated mold is filled with material and then rotated (e.g., about two perpendicular axes) to cause the material to disperse and stick to a wall of the mold. As another example, in some embodiments, the lower frame structure 60 may be manufactured by individually forming two or more pieces and then assembling these pieces together (e.g., individually forming two halves of the lower frame structure 60 and then assembling these two halves together; individually forming a core of the lower frame structure 60 and one or more of the interwheel guides $70_1$-$70_4$ and the fenders $80_2$, $80_3$ and then assembling these pieces together; etc.). Such individual forming of two or more pieces may be effected by individually molding (e.g., by an injection or other molding process), extruding, or otherwise forming these two or more pieces. Such assembling may be effected by welding (e.g., sonic welding), adhesive bonding, using one or more fasteners (e.g., bolts, screws, nails, etc.), or any other suitable technique.

As another example, while in this embodiment it is polymeric, in other embodiments, the nonmetallic material from which the lower frame structure 60 is at least mainly made may another nonmetallic material (e.g., a nonpolymer-matrix composite material).

As another example, while in this embodiment it is nonmetallic, in other embodiments, material from which the lower frame structure 60 is at least mainly made may be metallic. For example, in some embodiments, the lower frame structure 60 may be made of aluminum, steel or any other suitable metal. In such embodiments, the hollowness, the interwheel guides $70_1$-$70_4$ and the fenders $80_1$-$80_8$ of the lower frame structure 60 may be realized during molding of the lower frame structure 60. For instance, this may be achieved by a hydroforming process in which metallic material (e.g., an aluminum tube) intended to form the lower frame structure 60 is placed into a die and a high-pressure hydraulic fluid is used to force the metallic material against the die, thereby forming the lower frame structure 60. This illustrates that, in some embodiments, depending on the material making up the lower frame structure 60, the hollowness, the interwheel guides $70_1$-$70_4$ and the fenders $80_1$-$80_8$ of the lower frame structure 60 may be realized using a fluid-based molding process in which a pressurized fluid (e.g., gas in the case of a blow-molding process or hydraulic fluid in the case of a hydroforming process) forces the material against a mold to form the lower frame structure 60.

As another example, although in this embodiment it is metallic, in other embodiments, material from which the upper frame structure 62 is made may be nonmetallic material. For instance, in some embodiments, the upper frame structure 62 may be at least mainly made of a polymer or a polymer-matrix composite material (e.g., a fiber-reinforced polymer such as a carbon-fiber-reinforced polymer or glass-fiber-reinforced polymer).

As another example, while in this embodiment they are made of different materials, in other embodiments, the lower frame structure 60 and the upper frame structure 62 may be made of a common (i.e., the same) material. Also, while in this embodiment they are formed separately and then secured to one another, in other embodiments, the lower frame structure 60 and the upper frame structure 62 may be formed together simultaneously such that they are integral with one another (e.g., the lower frame structure 60 and the upper frame structure 62 may be molded together in a common molding process).

As another example, although in this embodiment the interwheel guides $70_1$-$70_4$, the fenders $80_1$-$80_8$ and the deflector 75 are integrally formed during molding of the frame 44, in other embodiments, one or more of the interwheel guides $70_1$-$70_4$, the fenders $80_1$-$80_8$ and the deflector guide 75 may be manufactured separately from a core of the frame 44 (possibly from materials different from that of the core of the frame 44) and affixed (e.g., welded, adhesively bonded, fastened using one or more fasteners, etc.) to the core of the frame 44.

Figure 26:
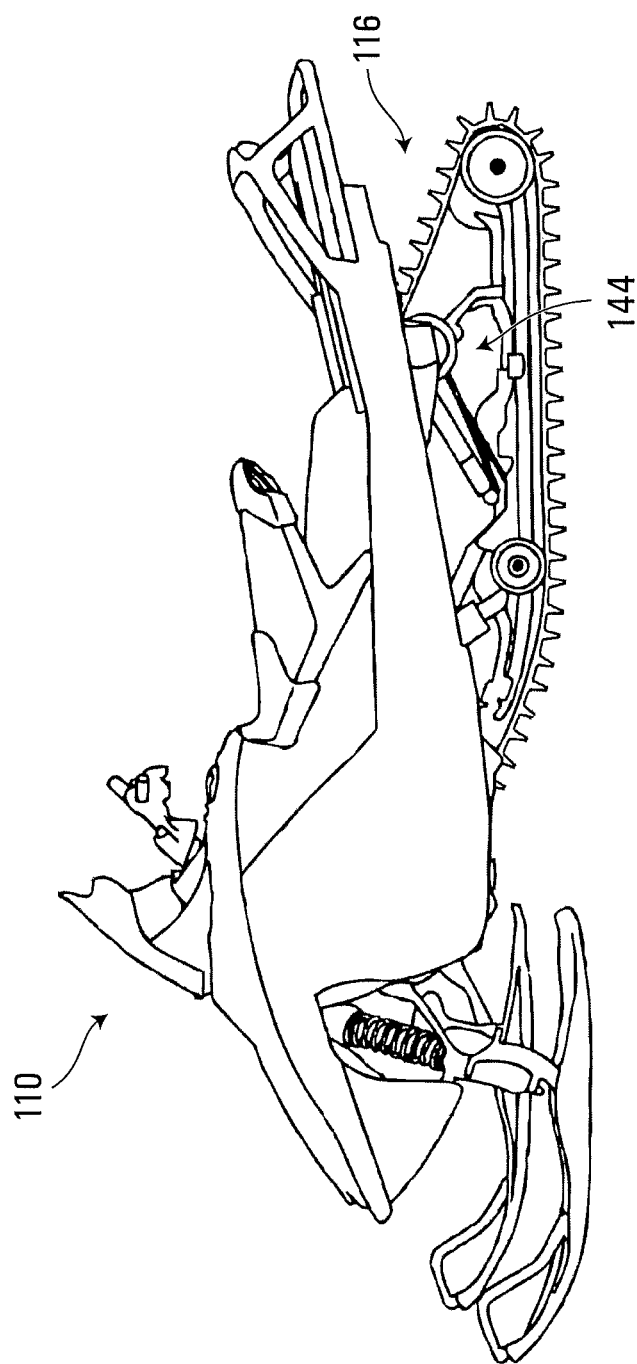
FIG. 26 shows an example of a snowmobile comprising a track assembly in accordance with another embodiment of the invention.

While in this embodiment the track assembly $16_i$ is part of an ATV, in other embodiments, a track assembly, including a frame, constructed according to principles discussed herein may be used as part of track assemblies of other types of off-road vehicles. For example, in some embodiments, as shown in FIG. 26, a frame 144 constructed according to principles discussed herein may be used as part of a track assembly 116 of a snowmobile 110.

The ATV 10 and the snowmobile 110 considered above are examples of recreational vehicles. While they can be used for recreational purposes, such recreational vehicles may also be used for utility purposes in some cases. Also, while these examples pertain to recreational vehicles, a track assembly, including a frame, constructed according to principles discussed herein may be used as part of track assemblies of off-road vehicles other than recreational ones.

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A track assembly for traction of an off-road vehicle, the track assembly comprising:
   a plurality of track-contacting wheels comprising:
      a drive wheel; and
      a plurality of idler wheels spaced apart in a longitudinal direction of the track assembly;
   an axis of rotation of the drive wheel being spaced apart from axes of rotation of the idler wheels;
   an endless track disposed around the track-contacting wheels and comprising an inner side facing the track-contacting wheels and a ground-engaging outer side for engaging the ground, the drive wheel being rotatable to impart motion of the endless track, the idler wheels contacting a bottom run of the endless track; and
   a frame supporting the idler wheels, the frame comprising a nonmetallic hollow frame structure supporting respective ones of the idler wheels, the nonmetallic hollow frame structure comprising a wall that includes a top surface, a bottom surface, and lateral surfaces of the nonmetallic hollow frame structure and defines a hollow interior of the nonmetallic hollow frame structure when the track assembly is mounted to the off-road vehicle.

2. The track assembly claimed in claim 1, wherein the nonmetallic hollow frame structure is a polymeric hollow frame structure.

3. The track assembly claimed in claim 2, wherein the polymeric hollow frame structure is a blow-molded polymeric hollow frame structure.

4. The track assembly claimed in claim 1, wherein the has a thickness of at least 1 mm.

5. The track assembly claimed in claim 1, wherein the has a thickness of at least 2 mm.

6. The track assembly claimed in claim 1, wherein the nonmetallic hollow frame structure is shaped to impede accumulation of undesirable ground matter over the nonmetallic hollow frame structure.

7. The track assembly claimed in claim 1, wherein a cross-sectional shape of the nonmetallic hollow frame structure changes along the longitudinal direction of the track assembly.

8. The track assembly claimed in claim 1, wherein the nonmetallic hollow frame structure extends at least as high as a given one of the idler wheels such that a point of the nonmetallic hollow frame structure aligned with a top of the given one of the idler wheels in the longitudinal direction of the track assembly is located at least as high as the top of the given one of the idler wheels.

9. The track assembly claimed in claim 8, wherein the nonmetallic hollow frame structure extends higher than the given one of the idler wheels such that the point of the nonmetallic hollow frame structure aligned with the top of the given one of the idler wheels in the longitudinal direction of the track assembly is located higher than the top of the given one of the idler wheels.

10. The track assembly claimed in claim 8, wherein the given one of the idler wheels is a first one of the idler wheels, the nonmetallic hollow frame structure extending at least as high as a second one of the idler wheels such that a point of the nonmetallic hollow frame structure aligned with a top of the second one of the idler wheels in the longitudinal direction of the track assembly is located at least as high as the top of the second one of the idler wheels.

11. The track assembly claimed in claim 1, wherein the frame comprises a metallic frame structure extending upwardly from the nonmetallic hollow frame structure.

12. The track assembly claimed in claim 11, wherein the metallic frame structure comprises a pair of frame members which converge upwardly.

13. The track assembly claimed in claim 11, wherein the frame is pivotable about a pivot axis, the track assembly comprising an anti-rotation connector to limit a pivoting movement of the track assembly, the anti-rotation connector being connected between the metallic frame structure and a chassis of the off-road vehicle.

14. The track assembly claimed in claim 1, wherein the frame is pivotable about a pivot axis.

15. The track assembly claimed in claim 14, wherein the pivot axis of the frame corresponds to the axis of rotation of the drive wheel.

16. The track assembly claimed in claim 1, wherein the nonmetallic hollow frame structure comprises an interwheel guide for contacting the bottom run of the endless track, the interwheel guide being located between a first one of the idler wheels and a second one of the idler wheels which are adjacent to one another in the longitudinal direction of the track assembly.

17. The track assembly claimed in claim 16, wherein the interwheel guide comprises a track-contacting surface having a point located, along a widthwise direction of the track assembly, where a point of a circumferential surface of each of the first one of the idler wheels and the second one of the idler wheels is located.

18. The track assembly claimed in claim 16, wherein a tangent to a track-contacting surface of the interwheel guide is generally parallel to a tangent to the first one of the idler wheels and the second one of the idler wheels.

19. The track assembly claimed in claim 16, wherein the interwheel guide is a first interwheel guide, the nonmetallic hollow frame structure comprising a second interwheel guide for contacting the bottom run of the endless track, the second interwheel guide being located between a third one of the idler wheels and a fourth one of the idler wheels that are adjacent to one another in the longitudinal direction of the track assembly.

20. The track assembly claimed in claim 1, wherein the nonmetallic hollow frame structure comprises a fender adjacent to a given one of the idler wheels.

21. The track assembly claimed in claim 20, wherein the fender comprises a wheel-facing surface which faces the given one of the idler wheels and generally conforms to a contour of the given one of the idler wheels.

22. The track assembly claimed in claim 21, wherein the wheel-facing surface is curved.

23. The track assembly claimed in claim 20, wherein the fender is a first fender and the given one of the idler wheels is a first one of the idler wheels, the nonmetallic hollow frame structure comprising a second fender adjacent to a second one of the idler wheels.

24. The track assembly claimed in claim 1, wherein the nonmetallic hollow frame structure comprises a deflector for deflecting unwanted ground matter transported by the endless track.

25. The track assembly claimed in claim 1, wherein the off-road vehicle is an all-terrain vehicle (ATV).

26. An off-road vehicle comprising the track assembly claimed in claim 1.

27. The track assembly claimed in claim 1, wherein the track assembly is steerable by a steering device of the off-road vehicle to change an orientation of the track assembly relative to a chassis of the off-road vehicle in order to steer the off-road vehicle.

28. The track assembly claimed in claim 1, wherein the hollow interior extends beneath the drive wheel in a widthwise direction of the track assembly.

29. The track assembly claimed in claim 1, wherein the hollow interior extends to at least one of the axis of rotation of a leading one of the idler wheels and the axis of rotation of a trailing one of the idler wheels in the longitudinal direction of the track assembly.

30. The track assembly claimed in claim 29, wherein the hollow interior extends to the axis of rotation of the leading one of the idler wheels and the axis of rotation of the trailing one of the idler wheels in the longitudinal direction of the track assembly.

31. The track assembly of claim 1, wherein the hollow interior surrounds an axle of a particular one of the idler wheels.

32. The track assembly claimed in claim 1, wherein the hollow interior is closed.

33. The track assembly claimed in claim 1, wherein the axis of rotation of the drive wheel is located between the axis of rotation of a leading one of the idler wheels and the axis of rotation of a trailing one of the idler wheels in the longitudinal direction of the track assembly.

34. The track assembly claimed in claim 1, wherein the hollow interior occupies a majority of a volume of the nonmetallic hollow frame structure.

35. The track assembly claimed in claim 1, wherein the wall has a thickness of no more than 5 mm.

36. The track assembly claimed in claim 1, wherein the bottom run of the endless track bends in the longitudinal direction of the track assembly between the axis of rotation of a leading one of the idler wheels and the axis of rotation of a trailing one of the idler wheels.

37. A track assembly for traction of an off-road vehicle, the track assembly comprising:
   a plurality of track-contacting wheels comprising:
      a drive wheel; and
      a plurality of idler wheels spaced apart in a longitudinal direction of the track assembly;
   an axis of rotation of the drive wheel being spaced apart from axes of rotation of the idler wheels;
   an endless track disposed around the track-contacting wheels and comprising an inner side facing the track-contacting wheels and a ground-engaging outer side for engaging the ground, the drive wheel being rotatable to impart motion of the endless track, the idler wheels contacting a bottom run of the endless track; and a frame supporting the idler wheels, the frame comprising a hollow frame structure supporting respective ones of the idler wheels, the hollow frame structure comprising a wall that includes a top surface, a bottom surface, and lateral surfaces of the hollow frame structure and defines a hollow interior of the hollow frame structure when the track assembly is mounted to the off-road vehicle, the hollow frame structure extending at least as high as a given one of the idler wheels such that a point of the hollow frame structure aligned with a top of the given one of the idler wheels in the longitudinal direction of the track assembly is located at least as high as the top of the given one of the idler wheels.

38. The track assembly claimed in claim 37, wherein the hollow frame structure extends higher than the given one of the idler wheels such that the point of the hollow frame structure aligned with the top of the given one of the idler wheels in the longitudinal direction of the track assembly is located higher than the top of the given one of the idler wheels.

39. The track assembly claimed in claim 37, wherein the given one of the idler wheels is a first one of the idler wheels, the hollow frame structure extending at least as high as a second one of the idler wheels such that a point of the hollow frame structure aligned with a top of the second one of the idler wheels in the longitudinal direction of the track assembly is located at least as high as the top of the second one of the idler wheels.

40. The track assembly claimed in claim 39, wherein the hollow frame structure extends at least as high as a third one of the idler wheels such that a point of the hollow frame structure aligned with a top of the third one of the idler wheels in the longitudinal direction of the track assembly is located at least as high as the top of the third one of the idler wheels.

41. The track assembly claimed in claim 37, wherein the hollow frame structure is a polymeric hollow frame structure.

42. The track assembly claimed in claim 41, wherein the polymeric hollow frame structure is a blow-molded polymeric hollow frame structure.

43. The track assembly claimed in claim 41, wherein the frame comprises a metallic frame structure extending upwardly from the polymeric hollow frame structure.

44. The track assembly claimed in claim 43, wherein the metallic frame structure comprises a pair of frame members which converge upwardly.

45. The track assembly claimed in claim 43, wherein the frame is pivotable about a pivot axis, the track assembly comprising an anti-rotation connector to limit a pivoting movement of the track assembly, the anti-rotation connector being connected between the metallic frame structure and a chassis of the off-road vehicle.

46. The track assembly claimed in claim 37, wherein the has a thickness of at least 1 mm.

47. The track assembly claimed in claim 37, wherein the wall has a thickness of at least 2 mm.

48. The track assembly claimed in claim 37, wherein the hollow frame structure is shaped to impede accumulation of undesirable ground matter over the hollow frame structure.

49. The track assembly claimed in claim 37, wherein a cross-sectional shape of the hollow frame structure changes along the longitudinal direction of the track assembly.

50. The track assembly claimed in claim 37, wherein the frame is pivotable about a pivot axis.

51. The track assembly claimed in claim 50, wherein the pivot axis of the frame corresponds to the axis of rotation of the drive wheel.

52. The track assembly claimed in claim 37, wherein the hollow frame structure comprises an interwheel guide for contacting the bottom run of the endless track, the interwheel guide being located between a first one of the idler wheels and a second one of the idler wheels which are adjacent to one another in the longitudinal direction of the track assembly.

53. The track assembly claimed in claim 52, wherein the interwheel guide comprises a track-contacting surface having a point located, along a widthwise direction of the track assembly, where a point of a circumferential surface of each of the first one of the idler wheels and the second one of the idler wheels is located.

54. The track assembly claimed in claim 52, wherein a tangent to a track-contacting surface of the interwheel guide is generally parallel to a tangent to the first one of the idler wheels and the second one of the idler wheels.

55. The track assembly claimed in claim 52, wherein the interwheel guide is a first interwheel guide, the hollow frame structure comprising a second interwheel guide for contacting the bottom run of the endless track, the second interwheel guide being located between a third one of the idler wheels and a fourth one of the idler wheels that are adjacent to one another in the longitudinal direction of the track assembly.

56. The track assembly claimed in claim 37, wherein the hollow frame structure comprises a fender adjacent to a given one of the idler wheels.

57. The track assembly claimed in claim 56, wherein the fender comprises a wheel-facing surface which faces the given one of the idler wheels and generally conforms to a contour of the given one of the idler wheels.

58. The track assembly claimed in claim 57, wherein the wheel-facing surface is curved.

59. The track assembly claimed in claim 56, wherein the fender is a first fender and the given one of the idler wheels is a first one of the idler wheels, the hollow frame structure comprising a second fender adjacent to a second one of the idler wheels.

60. The track assembly claimed in claim 37, wherein the hollow frame structure comprises a deflector for deflecting unwanted ground matter transported by the endless track.

61. The track assembly claimed in claim 37, wherein the off-road vehicle is an all-terrain vehicle (ATV).

62. An off-road vehicle comprising the track assembly claimed in claim 37.

63. The track assembly claimed in claim 37, wherein the track assembly is steerable by a steering device of the off-road vehicle to change an orientation of the track assembly relative to a chassis of the off-road vehicle in order to steer the off-road vehicle.

64. The track assembly claimed in claim 37, wherein the hollow interior extends beneath the drive wheel in a widthwise direction of the track assembly.

65. The track assembly claimed in claim 37, wherein the hollow interior extends to at least one of the axis of rotation of a leading one of the idler wheels and the axis of rotation of a trailing one of the idler wheels in the longitudinal direction of the track assembly.

66. The track assembly claimed in claim 65, wherein the hollow interior extends to the axis of rotation of the leading one of the idler wheels and the axis of rotation of the trailing one of the idler wheels in the longitudinal direction of the track assembly.

67. The track assembly of claim 37, wherein the hollow interior surrounds an axle of a particular one of the idler wheels.

68. The track assembly claimed in claim 37, wherein the hollow interior is closed.

69. The track assembly claimed in claim 37, wherein the axis of rotation of the drive wheel is located between the axis of rotation of a leading one of the idler wheels and the axis of rotation of a trailing one of the idler wheels in the longitudinal direction of the track assembly.

70. The track assembly claimed in claim 37, wherein the hollow interior occupies a majority of a volume of the hollow frame structure.

71. A track assembly for traction of an off-road vehicle, the track assembly comprising:
a plurality of track-contacting wheels comprising:
a drive wheel; and
a plurality of idler wheels spaced apart in a longitudinal direction of the track assembly;
an axis of rotation of the drive wheel being spaced apart from axes of rotation of the idler wheels;
an endless track disposed around the track-contacting wheels and comprising an inner side facing the track-contacting wheels and a ground-engaging outer side for engaging the ground, the drive wheel being rotatable to impart motion of the endless track, the idler wheels contacting a bottom run of the endless track; and
a frame supporting the idler wheels, the frame comprising a polymeric hollow frame structure supporting respective ones of the idler wheels, the polymeric hollow frame structure comprising a wall that includes a top surface, a bottom surface, and lateral surfaces of the polymeric hollow frame structure and defines a hollow interior of the polymeric hollow frame structure, the hollow interior of the polymeric hollow frame structure occupying a majority of a volume of the polymeric hollow frame structure.

72. The track assembly claimed in claim 71, wherein the hollow interior occupies at least 65% of the volume of the polymeric hollow frame structure.

73. The track assembly claimed in claim 71, wherein the hollow interior occupies at least 80% of the volume of the polymeric hollow frame structure.

74. The track assembly claimed in claim 71, wherein the polymeric hollow frame structure is a blow-molded polymeric hollow frame structure.

75. The track assembly claimed in claim 71, wherein the frame comprises a metallic frame structure extending upwardly from the polymeric hollow frame structure.

76. The track assembly claimed in claim 75, wherein the frame is pivotable about a pivot axis, the track assembly comprising an anti-rotation connector to limit a pivoting movement of the track assembly, the anti-rotation connector being connected between the metallic frame structure and a chassis of the off-road vehicle.

77. The track assembly claimed in claim 71, wherein the polymeric hollow frame structure is shaped to impede accumulation of undesirable ground matter over the polymeric hollow frame structure.

78. The track assembly claimed in claim 71, wherein a cross-sectional shape of the polymeric hollow frame structure changes along the longitudinal direction of the track assembly.

79. The track assembly claimed in claim 71, wherein the polymeric hollow frame structure extends at least as high as a given one of the idler wheels.

80. The track assembly claimed in claim 79, wherein the polymeric hollow frame structure extends higher than the given one of the idler wheels.

81. The track assembly claimed in claim 71, wherein the frame is pivotable about a pivot axis.

82. The track assembly claimed in claim 81, wherein the pivot axis of the frame corresponds to the axis of rotation of the drive wheel.

83. The track assembly claimed in claim 71, wherein the track assembly is steerable by a steering device of the off-road vehicle to change an orientation of the track assembly relative to a chassis of the off-road vehicle in order to steer the off-road vehicle.

84. The track assembly claimed in claim 71, wherein the off-road vehicle is an all-terrain vehicle (ATV).

85. An off-road vehicle comprising the track assembly claimed in claim 71.

86. A track assembly for traction of a vehicle, the track assembly comprising:
a plurality of track-contacting wheels comprising:
a drive wheel; and
a plurality of idler wheels spaced apart in a longitudinal direction of the track assembly;
an axis of rotation of the drive wheel being spaced apart from axes of rotation of the idler wheels;
a track disposed around the track-contacting wheels and comprising an inner side facing the track-contacting wheels and a ground-engaging outer side for engaging the ground, the drive wheel being rotatable to impart motion of the track, the idler wheels contacting a bottom run of the track; and
a frame supporting the idler wheels, the frame comprising a nonmetallic hollow frame structure supporting respective ones of the idler wheels, the nonmetallic hollow frame structure comprising a wall that encloses a hollow interior of the nonmetallic hollow frame structure when the track assembly is mounted to the vehicle.

87. The track assembly claimed in claim 86, wherein the hollow interior occupies a majority of a volume of the nonmetallic hollow frame structure.

88. The track assembly claimed in claim 87, wherein the hollow interior occupies at least 80% of the volume of the nonmetallic hollow frame structure.

89. The track assembly claimed in claim 86, wherein the nonmetallic hollow frame structure is a polymeric hollow frame structure.

90. The track assembly claimed in claim 89, wherein the polymeric hollow frame structure is a blow-molded polymeric hollow frame structure.

91. The track assembly claimed in claim 89, wherein the frame comprises a metallic frame structure extending upwardly from the polymeric hollow frame structure.

92. The track assembly claimed in claim 91, wherein the frame is pivotable about a pivot axis, the track assembly comprising an anti-rotation connector to limit a pivoting movement of the track assembly, the anti-rotation connector being connected between the metallic frame structure and a chassis of the vehicle.

93. The track assembly claimed in claim 86, wherein the nonmetallic hollow frame structure is shaped to impede accumulation of undesirable ground matter over the nonmetallic hollow frame structure.

94. The track assembly claimed in claim 86, wherein a cross-sectional shape of the nonmetallic hollow frame structure changes in the longitudinal direction of the track assembly.

95. The track assembly claimed in claim 86, wherein the nonmetallic hollow frame structure extends at least as high as a given one of the idler wheels.

96. The track assembly claimed in claim 95, wherein the nonmetallic hollow frame structure extends higher than the given one of the idler wheels.

97. The track assembly claimed in claim 86, wherein the frame is pivotable about a pivot axis.

98. The track assembly claimed in claim 97, wherein the pivot axis of the frame corresponds to the axis of rotation of the drive wheel.

99. The track assembly claimed in claim 86, wherein the hollow interior extends beneath the drive wheel in a widthwise direction of the track assembly.

100. The track assembly claimed in claim 86, wherein the hollow interior extends to at least one of the axis of rotation of a leading one of the idler wheels and the axis of rotation of a trailing one of the idler wheels in the longitudinal direction of the track assembly.

101. The track assembly claimed in claim 100, wherein the hollow interior extends to the axis of rotation of the leading one of the idler wheels and the axis of rotation of the trailing one of the idler wheels in the longitudinal direction of the track assembly.

102. The track assembly of claim 86, wherein the hollow interior surrounds an axle of a particular one of the idler wheels.

103. The track assembly claimed in claim 86, wherein the hollow interior is closed to prevent ground matter from entering into the hollow interior.

104. The track assembly claimed in claim 86, wherein the wall has a thickness of at least 1 mm.

105. The track assembly claimed in claim 86, wherein the wall has a thickness of no more than 5 mm.

106. The track assembly claimed in claim 86, wherein the bottom run of the endless track bends in the longitudinal direction of the track assembly between the axis of rotation of a leading one of the idler wheels and the axis of rotation of a trailing one of the idler wheels.

107. The track assembly claimed in claim 86, wherein the track assembly is steerable by a steering device of the vehicle to change an orientation of the track assembly relative to a chassis of the vehicle in order to steer the vehicle.

108. The track assembly claimed in claim 86, wherein the vehicle is an all-terrain vehicle (ATV).

109. A vehicle comprising the track assembly claimed in claim 86.

110. A track assembly for traction of a vehicle, the track assembly comprising:
   a plurality of track-contacting wheels comprising:
      a drive wheel; and
      a plurality of idler wheels spaced apart in a longitudinal direction of the track assembly;
   an axis of rotation of the drive wheel being spaced apart from axes of rotation of the idler wheels;
   a track disposed around the track-contacting wheels and comprising an inner side facing the track-contacting wheels and a ground-engaging outer side for engaging the ground, the drive wheel being rotatable to impart motion of the track, the idler wheels contacting a bottom run of the track; and
   a frame supporting the idler wheels, the frame comprising a polymeric hollow frame structure supporting respective ones of the idler wheels, the polymeric hollow frame structure comprising a molded wall that defines a molded hollow interior of the polymeric hollow frame structure when the track assembly is mounted to the vehicle.

\* \* \* \* \*